US011815014B2

(12) United States Patent
Jin

(10) Patent No.: US 11,815,014 B2
(45) Date of Patent: Nov. 14, 2023

(54) COMBINED COOLING HEATING AND POWER MICRO GAS TURBINE DEVICE

(71) Applicant: TxEGT AUTOMOTIVE POWERTRAIN TECHNOLOGY CO., LTD, Beijing (CN)

(72) Inventor: Pu Jin, Beijing (CN)

(73) Assignee: TxEGT AUTOMOTIVE POWERTRAIN TECHNOLOGY CO., LTD, Beijing (CN)

( * ) Notice: Subject to any disclaimer, the term of this patent is extended or adjusted under 35 U.S.C. 154(b) by 51 days.

(21) Appl. No.: 17/625,346

(22) PCT Filed: Dec. 11, 2020

(86) PCT No.: PCT/CN2020/135899
§ 371 (c)(1),
(2) Date: Jan. 7, 2022

(87) PCT Pub. No.: WO2021/129431
PCT Pub. Date: Jul. 1, 2021

(65) Prior Publication Data
US 2022/0282667 A1 Sep. 8, 2022

(30) Foreign Application Priority Data
Dec. 27, 2019 (CN) .......................... 201911371430.3

(51) Int. Cl.
*F02C 3/14* (2006.01)
*F02C 6/18* (2006.01)
(Continued)

(52) U.S. Cl.
CPC .................. *F02C 3/14* (2013.01); *F02C 6/18* (2013.01); *F02C 7/06* (2013.01); *F02C 7/12* (2013.01);
(Continued)

(58) Field of Classification Search
CPC .... F01D 15/10; F02C 3/14; F02C 6/18; F02C 7/06; F05D 2220/64; F05D 2220/76; F05D 2240/52
See application file for complete search history.

(56) References Cited

U.S. PATENT DOCUMENTS 6,430,917 B1 * 8/2002 Platts .................... F04D 29/284
60/39.43
8,327,644 B2 * 12/2012 Gordon ..................... F02C 7/22
60/745
(Continued)

FOREIGN PATENT DOCUMENTS

CN           202645736 U       1/2013
CN           104929777 A   *   9/2015
(Continued)

*Primary Examiner* — Craig Kim
(74) *Attorney, Agent, or Firm* — Bayramoglu Law Offices LLC

(57) ABSTRACT

A combined cooling heating and power micro gas turbine device includes a micro gas turbine. The micro gas turbine includes a gas compressor, a turbine and a combustion chamber assembly. The combustion chamber assembly includes a combustion chamber, an air inlet cavity, an air inlet channel and an exhaust channel. The air inlet cavity includes an interior air inlet cavity and an exterior air inlet cavity that are integrated, an air outlet end of the exterior air inlet cavity is communicated with an air inlet end of the interior air inlet cavity, an air inlet end of the exterior air inlet cavity is communicated with the air inlet channel, the air inlet channel is communicated with the gas compressor, the combustion chamber is arranged between the interior air inlet cavity and the exterior air inlet cavity, and an air outlet of the combustion chamber is communicated with the exhaust channel.

19 Claims, 9 Drawing Sheets

(51) Int. Cl.
*F02C 7/06* (2006.01)
*F02C 7/12* (2006.01)
*F23R 3/04* (2006.01)

(52) U.S. Cl.
CPC ............ *F23R 3/04* (2013.01); *F05D 2220/64* (2013.01); *F05D 2220/76* (2013.01); *F05D 2240/52* (2013.01); *F05D 2240/54* (2013.01)

(56) References Cited

U.S. PATENT DOCUMENTS

| | | | |
|---|---|---|---|
| 8,393,160 B2 * | 3/2013 | Prabhu | F02C 7/2365 60/779 |
| 2002/0060556 A1 * | 5/2002 | Wall | H02J 3/38 322/29 |
| 2004/0005228 A1 | 1/2004 | Agrawal et al. | |
| 2017/0234315 A1 * | 8/2017 | Hammoud | F02C 3/10 60/801 |
| 2019/0024511 A1 * | 1/2019 | Taguchi | F01D 5/026 |
| 2019/0153938 A1 * | 5/2019 | Hammoud | F02C 7/185 |
| 2019/0170190 A1 * | 6/2019 | Ryu | F16C 27/06 |
| 2022/0282667 A1 * | 9/2022 | Jin | F01D 25/22 |

FOREIGN PATENT DOCUMENTS

| | | | | |
|---|---|---|---|---|
| CN | 105889313 A | * | 8/2016 | ............ F01D 15/10 |
| CN | 205858947 U | | 1/2017 | |
| CN | 205858947 U | * | 1/2017 | |
| CN | 105593542 B | * | 2/2018 | ........... F01D 25/164 |
| CN | 107849977 A | * | 3/2018 | ................ F02C 6/18 |
| CN | 108474298 A | * | 8/2018 | ................ F02C 3/04 |
| CN | 109356720 A | | 2/2019 | |
| CN | 111075563 A | | 4/2020 | |
| CN | 111237060 A | * | 6/2020 | |
| CN | 211314387 U | | 8/2020 | |
| CN | 211343133 U | | 8/2020 | |
| CN | 211474266 U | | 9/2020 | |
| CN | 113309617 A | * | 8/2021 | ................ F02C 3/14 |
| EP | 4148281 A1 | * | 3/2023 | ................ F02C 3/04 |
| WO | WO-2023030467 A1 | * | 3/2023 | |

\* cited by examiner

COMBINED COOLING HEATING AND POWER MICRO GAS TURBINE DEVICE

CROSS REFERENCE TO THE RELATED APPLICATIONS

This application is the national phase entry of International Application No. PCT/CN2020/135899, filed on Dec. 11, 2020, which is based upon and claims priority to Chinese Patent Application No. 201911371430.3, filed on Dec. 27, 2019, the entire contents of which are incorporated herein by reference.

TECHNICAL FIELD

The present invention relates to the related technical field of gas turbines, in particular to a combined cooling heating and power micro gas turbine device.

BACKGROUND

The micro gas turbine is a small heat engine developed recently. The single power range is 25-300 kW and the basic technical characteristic is radial flow impeller machinery and regenerative cycle. The micro gas turbine primarily includes three components: a gas compressor, a combustion chamber and a turbine. Air entering the gas compressor is compressed to high-temperature and high-pressure air and is then fed to the combustion chamber to be mixed with a fuel to combust, and a high-temperature and high-pressure fuel generated thereby expands in the turbine to produce work. In the prior art, the micro gas turbine is large in size and not compact enough in structural design, so that it is hard to guarantee efficient heat exchange efficiency and stable operation at a high speed.

The micro gas turbine may be used in distributed power generation. Compared with a central power station, the power station is closer to a user, so that the power station is better in reliability. As far as a terminal user is concerned, compared with other small power generating apparatuses, the micro gas turbine is a better environmental-friendly power generating apparatus, or is about to become one of basic constitutions of public utility in the future, and may operate in parallel to a central power plant. However, it still has the problem that an existing gas heat supply device is large in size and large in occupied space. On the other hand, an air blower is needed to supply gas in a working process of the existing gas heat supply device and it is necessary to maintain and repair frequently, so that the manpower is wasted. Meanwhile, the existing gas heat supply device is relatively single in function, too.

SUMMARY

In order to solve the technical problems, an objective of the present invention is to provide a combined cooling heating and power micro gas turbine device which has the advantages of being small in size, maintenance-free, efficient in heat exchange efficiency and stable in operation at the high speed and may select a heat supply mode or a power supply module or a combined heat and power model flexibly according to terminals.

A technical scheme of the present invention is as follows:

A combined cooling heating and power micro gas turbine device, the device including a micro gas turbine, wherein the micro gas turbine includes a gas compressor, a turbine and a combustion chamber assembly;

the combustion chamber assembly includes a combustion chamber, an air inlet cavity, an air inlet channel and an exhaust channel, the air inlet cavity includes an interior air inlet cavity and an exterior air inlet that are integrated, an air outlet end of the exterior air inlet cavity is communicated with an air inlet end of the interior air inlet cavity, an air inlet end of the exterior air inlet cavity is communicated with the air inlet channel, the air inlet channel is communicated with an air outlet end of the gas compressor, the combustion chamber is arranged between the interior air inlet cavity and the exterior air inlet, and an air outlet of the combustion chamber is communicated with the exhaust channel; and an impeller of the gas compressor is coaxially connected with the turbine through a rotating shaft, and a rim of the turbine stretches into the exhaust channel; and the rotating shaft is rotatably mounted in an air bearing.

Further, the micro gas turbine device is connected with a heating device to supply heat, and the heating device is communicated with the air outlet end of the exhaust channel of the combustion chamber assembly.

Further, the micro gas turbine device is connected with a refrigerating device to refrigerate, and the refrigerating device is communicated with the air outlet end of the exhaust channel of the combustion chamber assembly.

Further, the micro gas turbine device is connected with a power generating device to generate electricity; and the power generating device includes a generating impeller, the generating impeller stretches into the exhaust channel to be pushed to rotate by exhausted gas, and the rotating generating impeller drives a rotor of the power generating device to rotate to generate electricity.

Further, the power generating device is a generator; the generator includes the rotor, a stator, a coil, a first bearing and a second bearing, the rotor penetrates through the power generating impeller, and the first bearing, the stator, the coil and the second bearing successively; the first bearing is a radial thrust integrated air bearing, including a radial portion sleeved on the rotor and a thrust portion sleeved on a thrust disc, and the thrust disc is fixed onto the rotor; and the second bearing is a radial air bearing.

Further, the interior air inlet cavity and the exterior air inlet cavity are both annular, and an air outlet end at the tail end of the exterior air inlet cavity is communicated with the air inlet end of the interior air inlet cavity in a rewinding manner and encloses the combustion chamber;

a radial inner wall and a radial outer wall of the combustion chamber are provided with pores, and the radial inner wall and the radial outer wall respectively separate the combustion chamber from the interior air inlet cavity and the exterior air inlet cavity;

the exhaust channel is annular and is arranged around an axis of the rotating shaft, and the air outlet of the combustion chamber is arranged in a front side of a turbine on a front portion of the exhaust channel.

Further, the turbine is an axial flow turbine, and a rim of the axial flow turbine is perpendicular to the exhaust channel.

Further, the air inlet channel is arranged around the rotating shaft, and the air inlet cavity, the combustion chamber and the exhaust channel are arranged around the turbine; and diameters of the combustion chamber close to the air outlet of the combustion chamber are decreased gradually.

Further, the gas compressor further includes an air inlet barrel and a back end cover that are integrated; the impeller is fixed to the front end of the rotating shaft in a sleeving manner;

a front fixed end cover sleeves a position of the rotating shaft close to the impeller, an air outlet channel of the gas compressor is formed in a gap between the front fixed end cover and the back end cover, and the air outlet channel and the air inlet barrel are communicated with the air inlet channel of the combustion chamber assembly;

the front end of an inner side wall of the air inlet channel of the combustion chamber assembly is fixed to an edge of the front fixed end cover, and an outer side wall thereof is fixed to an edge of the back end cover; and a back fixed end cover sleeves a position of the rotating shaft close to the turbine, and a connecting arm of the combustion chamber assembly close to the back fixed end cover is fixedly connected with the back fixed end cover.

Further, sealing members are arranged between the rime of the turbine and the exhaust channel, between the rotating shaft and the front fixed end cover, between the rotating shaft and the back fixed end cover and between the turbine and the back fixed end cover to seal.

Further, a middle of the rotating shaft is provided with the thrust disc, and the air bearing includes a thrust bearing sleeved on the thrust disc and radial bearings sleeved at two ends of the rotating shaft;

the thrust bearing includes a first bearing body and a second bearing body, the first bearing body and the second bearing body are symmetrically mounted with the thrust disc axially and has a preset first axial gap S1, outer end walls of the first bearing body and the second bearing body are respectively provided with a first air slot and a second air slot, bottoms of the first air slot and the second air slot are provided with ventilating pores, the pores are communicated with each of the first air slots and the second air slots and the corresponding first axial gap S1, a preset third radial gap S3 is formed between an inner ring of each of the first bearing body and the second bearing body and the rotating shaft, and a preset fourth radial gap S4 is formed between a side wall of a thrust disc accommodating groove enclosed by the first bearing body and the second bearing body and the side wall of the thrust disc;

an outer wall of the radial bearing is provided with an air slot, a preset second radial gap S2 is formed between the inner wall of the radial bearing and the rotating shaft, the bottom of the air slot is provided with a ventilating pore, and the pore is communicated with the air slot and the second radial gap S2.

Further, the thrust bearing further includes a first bearing shell and a second bearing shell, the first bearing shell includes an end portion and a peripheral portion, the end portion thereof is mounted at an outer end of the first bearing body and the peripheral portion thereof covers a periphery of one radial bearing hermetically;

the second bearing shell includes a first cylindrical peripheral portion and a second cylindrical peripheral portion that are arranged in a stepped manner, the first peripheral portion covers the peripheries of the first bearing body and the second bearing body, and the second peripheral portion covers the periphery of the other radial bearing hermetically; and the first peripheral portion of the second bearing shell is fixedly connected with an end portion of the first bearing shell axially, and the first bearing shell and/or the second bearing shell are static parts.

Further, one end of the rotating shaft close to the turbine is provided with the thrust disc, and the air bearing includes the thrust bearing sleeved on the thrust disc and the radial bearing sleeved at the end of the rotating shaft close to the impeller of the gas compressor;

the thrust bearing includes a first bearing body and a second bearing body, the first bearing body and the second bearing body are symmetrically mounted with the thrust disc axially and has a preset first axial gap S1, outer end walls of the first bearing body and the second bearing body are respectively provided with a first air slot and a second air slot, bottoms of the first air slot and the second air slot are provided with ventilating pores, the pores are communicated with each of the first air slots and the second air slots and the corresponding first axial gap S1, a preset third radial gap S3 is formed between an inner ring of each of the first bearing body and the second bearing body and the rotating shaft, and a preset fourth radial gap S4 is formed between a side wall of a thrust disc accommodating groove enclosed by the first bearing body and the second bearing body and the side wall of the thrust disc; and an outer wall of the radial bearing is provided with an air slot, a preset second radial gap S2 is formed between the inner wall of the radial bearing and the rotating shaft, the bottom of the air slot is provided with a ventilating pore, and the pore is communicated with the air slot and the second radial gap S2.

Further, the thrust bearing further includes a first bearing shell and a second bearing shell, the first bearing shell includes an end portion and a peripheral portion, the end portion thereof is mounted at an one end of the first bearing body and the peripheral portion thereof covers a periphery of the radial bearing hermetically;

the second bearing shell includes a peripheral portion and an end portion, the peripheral portion thereof covers the peripheries of the first bearing body and the second bearing body, and the end portion thereof is mounted at the outer end of the second bearing body; and the peripheral portion of the second bearing shell is fixedly connected with the end portion of the first bearing shell axially, and the first bearing shell and/or the second bearing shell are static parts.

Further, one end of the rotating shaft close to the impeller of the gas compressor is provided with the thrust disc, and the air bearing includes a thrust bearing sleeved on the thrust disc and a radial bearing sleeved at the end of the rotating shaft close to the turbine;

the thrust bearing includes a first bearing body and a second bearing body, the first bearing body and the second bearing body are symmetrically mounted with the thrust disc axially and have a preset first axial gap, outer end walls of the first bearing body and the second bearing body are respectively provided with a first air slot and a second air slot, bottoms of the first air slot and the second air slot are provided with ventilating pores, the pores are communicated with each of the first air slots and the second air slots and the corresponding first axial gap S1, a preset third radial gap S3 is formed between an inner ring of each of the first bearing body and the second bearing body and the rotating shaft, and a preset fourth radial gap S4 is formed between a side wall of a thrust disc accommodating groove enclosed by the first bearing body and the second bearing body and the side wall of the thrust disc; and an outer wall of the radial bearing is provided with an air slot, a preset second radial gap S2 is formed between the inner wall of the radial bearing and the rotating shaft, the bottom of the air slot is provided with a ventilating pore, and the pore is communicated with the air slot and the second radial gap S2.

Further, the thrust bearing further includes a first bearing shell and a second bearing shell, the first bearing shell includes an end portion, and the end portion thereof is mounted at an outer end of the first bearing body;

the second bearing shell includes a peripheral portion and an end portion, the peripheral portion thereof covers the peripheries of the first bearing body and the second bearing body, and the end portion thereof is mounted at the outer end of the second bearing body; and the peripheral portion of the second bearing shell is fixedly connected with the end portion of the first bearing shell axially;

the radial bearing further includes a radial bearing shell sleeving the periphery thereof, and the radial bearing shell is fixedly connected with the periphery portion of the second bearing shell; and the first bearing shell and/or the second bearing shell are static parts.

Further, the air bearing includes thrust bearings sleeved at two ends of the rotating shaft and a radial bearing sleeved in the middle of the rotating shaft;

the thrust bearing includes the first bearing body and the second bearing body, preset first axial gaps S1 are formed between the first bearing body and the impeller and between the second bearing body and the turbine, end walls of the first bearing body and the second bearing body close to the radial bearing are respectively provided with a first air slot and a second air slot, bottoms of the first air slot and the second air slot are provided with ventilating pores, the pores are communicated with the first air slot and the second air slot and the corresponding first axial gap S1, and a preset third radial gap S3 is formed between the inner ring of each of the first bearing body and the second bearing body and the rotating shaft; and an outer wall of the radial bearing is provided with an air slot, a preset second radial gap is formed between the inner wall of the radial bearing and the rotating shaft, the bottom of the air slot is provided with a ventilating pore, and the pore is communicated with the air slot and the second radial gap S2.

Further, an integrated bearing shell is further arranged out of the air bearing, and the bearing shell includes the first bearing shell, the second bearing shell and the radial bearing shell;

the first bearing shell includes an end portion, and the end portion thereof is mounted at the one end of the first bearing body;

the second bearing shell includes an end portion, and the end portion thereof is mounted at one end of the second bearing body;

the radial bearing shell is sleeved in a middle section of the rotating shaft; and the bearing shell is the static part.

Further, the heating device includes a boiler;

the boiler is connected with the exhaust channel and is heated by a combustion product sprayed by the exhaust channel.

Further, the refrigerating device is a lithium bromide refrigerating unit, an alcohol refrigerating device or a steam refrigerator.

Compared with the prior art, the present invention has the following beneficial effects:

1. The heating device provided by the present invention has the advantages of being small in size and maintenance-free, may select a heat supply mode or a power supply module or a combined heat and power model flexibly according to heating terminals, and meanwhile, the present invention is compact in structure, the axial length is minimized, and it may be ensured that the pressure of the fuel gas supplied to the combustion chamber is matched with the pressure of air automatically independent of the rotating speed of the rotor assembly.

2. According to a structural arrangement of the combustion chamber of the present invention, the air inlet cavity is of a "C"-shaped cladding combustion chamber, and the annular interior air inlet cavity and the annular exterior air inlet cavity are connected in a winding manner, so that the air inlet path is prolonged; as a result of high temperature in the combustion chamber, gas in each portion of the air inlet cavity may be preheated by heat exchange, so that the reaction efficiency is improved; on the other hand, air may be sucked in all direction of the combustion chamber wall, so that the combustion reaction is fuller; the outlet of the combustion chamber is formed in the front side of the turbine, the axial length of the rotating shaft is relatively small, the rotor is more stable to rotate, and the integral volume is smaller.

3. A structural design of the rotor system of the gas turbine of the present invention may ensure stable operation of the gas turbine at the high speed.

4. According to a heating model designed in the present invention, under a 100 kW heating experimental condition, stable operation may be realized, and noise and pollutants both meet a discharge requirement.

5. The micro gas turbine of the present invention may further be used for refrigeration and may be used for cooling in summer or hot regions; besides direct cold air blowing, the refrigerating device may further decrease the ambient temperature via a medium (such as earth cooling, or introduction of cold water in an existing heating pipeline).

DETAILED DESCRIPTION OF THE EMBODIMENTS

Figure 1:
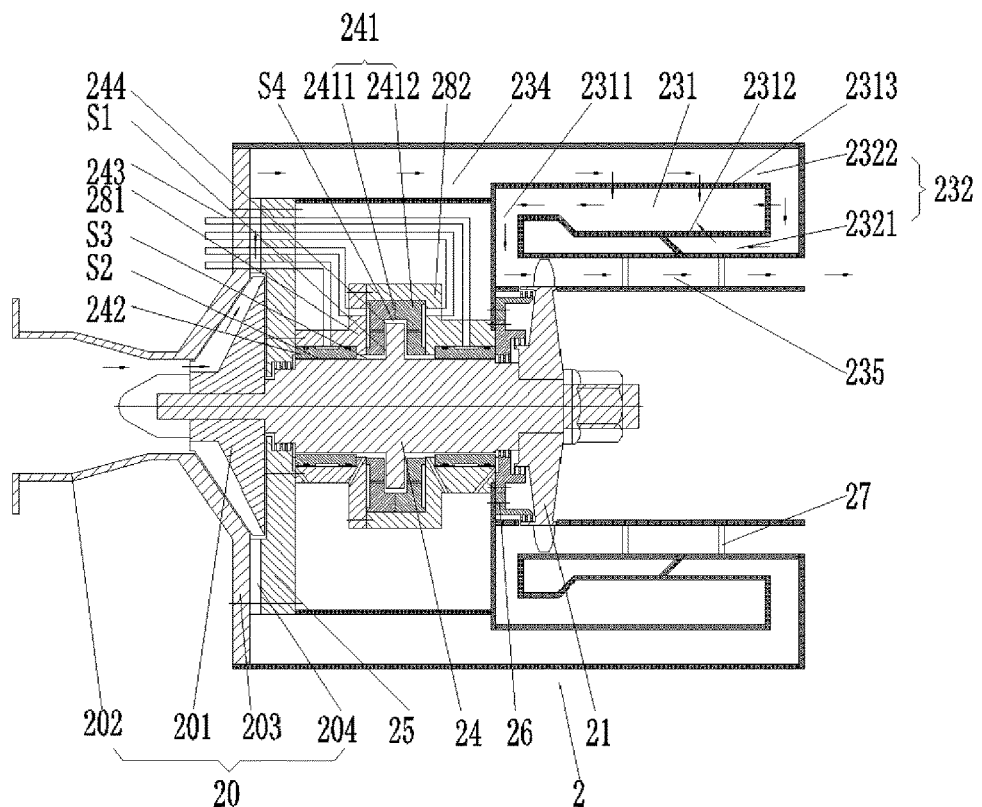
FIG. 1 is a structural schematic diagram of an embodiment I of a combined cooling heating and power micro gas turbine device.

In order to better understand the technical scheme of the present invention, further description of the present invention will be made below in combination with specific embodiments and drawings of the description.

A combined cooling heating and power micro gas turbine device provided by the present invention primarily includes a micro gas turbine 2 and a heating device.

FIG. 1 to FIG. 8 show a structural schematic diagram of an embodiment VIII of a combined cooling heating and power micro gas turbine device provided by the embodiments of the present invention. The micro gas turbine primarily includes a gas compressor 20, a turbine 21 and a combustion chamber assembly. Its working flow is as follows: gas enters the gas compressor 20 first and then enters the combustion chamber 231 of the combustion chamber assembly after being pressurized by the gas compressor 20, a hot combustion product, i.e., high-temperature gas, is sprayed out from the outlet of the combustion chamber 231, so that a heat source may be provided to the heating device; meanwhile, the high-temperature gas pushes the turbine 21 to rotate to drive the gas compressor 20 coaxially connected therewith through the rotating shaft 24 to rotate, and in such arrangement, the gas compressor 20 is no longer driven by other apparatuses to operate, so that the operating cost of the device may be lowered effectively.

Specifically, the combustion chamber assembly includes a combustion chamber 231, an air inlet cavity 232, an air inlet channel 234 and an exhaust channel 235;

the air inlet cavity 232 is arranged around the combustion chamber 231, the air inlet cavity 232 includes an annular interior air inlet cavity 2321 and an annular exterior air inlet cavity 2322 that are integrated, a gas outlet end of a tail of the annular exterior air inlet cavity 2322 is communicated with an air inlet end of the interior air inlet cavity 2321 in a winding manner and encloses the combustion chamber 231, the air inlet end of the air inlet cavity 232 is connected with the air inlet channel 234, and the air inlet channel 234 receives a gas from the gas compressor 20;

The combustion chamber 231 is annular and is arranged between the interior air inlet cavity 2321 and the exterior air inlet cavity 2322, and the interior air inlet cavity 2321 and the exterior air inlet cavity 2322 are respectively disposed on a radial inner side and a radial outer side of the combustion chamber 231. The air outlet 2311 of the combustion chamber is communicated with a front portion of an exhaust channel 235, the exhaust channel 235 is annular and is arranged in the radial direction of the gas turbine 2 around an axis of the rotating shaft 24, and the air outlet 2311 of the combustion chamber is formed, located in the front side of the turbine 21, of the front portion of the exhaust channel 235;

The radial inner wall 2312 and the radial outer wall 2313 of the combustion chamber 231 are provided with pores, so that gas entering the exterior air inlet cavity 2322 and the interior air inlet cavity 2321 enters the combustion chamber 231, and the radial inner wall 2312 and the radial outer wall 2313 respectively separate the combustion chamber 231 from the interior air inlet cavity 2321 and the exterior air inlet cavity 2322.

Preferably, supporting ribs 27 may be additionally arranged among all walls of the combustion chamber 231, the air inlet cavity 232, the exhaust channel 235 and the air inlet channel 234 so as to increase the integral strength of the combustion chamber assembly.

Preferably, all parts of the combustion chamber 231 are made from a high-temperature-resistant material such as stainless steel.

The impeller 201 of the gas compressor 20 and the turbine 21 of the present invention are coaxially connected and mounted to the rotating shaft 24, and the rim of the turbine 21 stretches into the exhaust channel 235 that surrounds the rotating shaft 24 thereof. Thus, the hot combustion product sprayed by the exhaust channel 235 may push the turbine 21 to rotate at the high speed so as to further drive the gas compressor to rotate via the turbine 21.

Preferably, the rim of the turbine 21 is perpendicular to the exhaust channel 235, and the turbine 21 is an axial flow turbine.

Preferably, the air inlet channel 234 of the combustion chamber assembly is arranged externally around the rotating shaft 24, the air inlet cavity 232 at the tail end of the air inlet channel 234, the combustion chamber 231 and the exhaust channel 235 are arranged around the turbine 21 and stretch out of the turbine 21, and the rim of the turbine 21 stretches into the exhaust channel 235 and the turbine is arranged to face exhaust gas; and the diameter of the combustion chamber 231 close to the air outlet end shrinks gradually.

Preferably, the gas compressor 20 further includes an air inlet barrel 202 and a back end cover 203 that are integrated; the impeller 201 is fixed to the front end of the rotating shaft 24 in a sleeving manner;

a front fixed end cover 25 is sleeved on a position of the rotating shaft 24 close to the impeller 201, an air outlet channel 204 of the gas compressor is formed in a gap between the front fixed end cover 25 and the back end cover 203, the air inlet channel 234 of the combustion chamber 231 includes an inner side wall and an outer side wall, the front end of the inner side wall is fixed to the edge of the front fixed end cover 25, and the outer side wall is fixed to the edge of the back end cover 203 of the gas compressor 20;

a back fixed end cover 26 is sleeved on a position of the rotating shaft 24 close to the turbine 21, and a wall of the combustion chamber assembly 23 close to the back fixed end cover 26 is fixed thereto. According to the structural arrangement, the gas compressor 20 and the combustion chamber assembly are compact in structure and small in occupied space.

Preferably, sealing members are arranged between the rim of the turbine 21 and the exhaust channel 235, between the rotating shaft 24 and the front fixed end cover 25, between the rotating shaft 24 and the back fixed end cover 26 and between the turbine 21 and the back fixed end cover 26 to seal so as to guarantee the sealing property.

The present invention is compact in structure, the axial length is minimized, and it may be ensured that the pressure of the fuel gas supplied to the combustion chamber 231 is matched with the pressure of air automatically independent of the rotating speed of the rotor assembly. Meanwhile, the air inlet cavity 232 is of a "C"-shaped cladding combustion chamber 231, and the annular interior air inlet cavity 2321 and the annular exterior air inlet cavity 2322 are connected in a winding manner, so that the air inlet path is prolonged; as a result of high temperature in the combustion chamber 231, gas in each portion of the air inlet cavity 232 may be preheated by heat exchange, so that the reaction efficiency is improved; on the other hand, air may be sucked in all direction of the wall of the combustion chamber 231, so that the combustion reaction is fuller; the outlet 2311 of the combustion chamber is formed in the front side of the turbine 21, the axial length of the rotating shaft 24 is relatively small, the rotor is more stable to rotate, and the integral volume is smaller.

The embodiments of the present invention further provide various supporting structures for the rotating shaft 24 of the micro gas turbine. Its specific structure is illustrated in embodiments I to VIII.

Example I

In the embodiment, referring to FIG. 1, a middle portion of the rotating shaft 24 of the micro gas turbine 2 is provided with the thrust disc, and the thrust disc is provided with the thrust bearing 241; and radial bearings 242 are respectively sleeved at two ends of the rotating shaft 24.

The thrust bearing 241 is mounted on the rotating shaft 24 and includes a first bearing body 2411 and a second bearing body 2412 that are arranged symmetrically, the first bearing body 2411 and the second bearing body 2412 are symmetrically mounted with the thrust disc axially and have a preset first axial gap S1, outer end walls of the first bearing body 2411 and the second bearing body 2412 are respectively provided with a first air slot and a second air slot, bottoms of the first air slot and the second air slot are provided with ventilating pores, the pores are communicated with each of the air slots and the corresponding first axial gap S1, a preset third radial gap S3 is formed between an inner ring of each of the first bearing body 2411 and the second bearing body 2412 and the rotating shaft 24, and a fourth radial gap S4 is formed between a side wall of a thrust disc accommodating groove 244 enclosed by the first bearing body 2411 and the second bearing body 2412 and the side wall of the thrust disc.

The radial bearing 242 is mounted on the rotating shaft 24, an outer wall of the radial bearing is provided with an air slot, a preset second radial gap S2 is formed between the inner wall of the radial bearing 242 and the rotating shaft 24, the bottom of the air slot is provided with a ventilating pore, and the pore is communicated with the air slot and the second radial gap S2.

The micro gas turbine 2 is internally provided with an air inlet pipe 243 to supply gas to the air slots respectively and gas enters the first axial gap S1 and the second radial gap S2 respectively along the air inlet hole to form gas films.

Preferably, the thrust bearing 241 further includes a first bearing shell 281 and a second bearing shell 282, the first bearing shell 281 includes an end portion and a peripheral portion, the end portion thereof is mounted at an outer end of the first bearing body 2411 and the peripheral portion thereof covers a periphery of one radial bearing 242 hermetically; the second bearing shell 282 includes a first cylindrical peripheral portion and a second cylindrical peripheral portion that are arranged in a stepped manner, the first peripheral portion covers the peripheries of the first bearing body 2411 and the second bearing body 2412, and the second peripheral portion covers the periphery of the other radial bearing hermetically 242. The peripheral portion of the second bearing shell 282 is fixed to the end portion of the first bearing shell 281 axially. The first bearing shell 281 and/or the second bearing shell 282 are static parts.

The first bearing shell 281 and/or the second bearing shell 282 are provided with pressure-reducing holes.

Specifically, the thrust bearing 241 and the radial bearing 242 of the embodiment both are air bearings, and may be any one of a static pressure gas bearing, a dynamic pressure gas bearing or a dynamic and static pressure mixed gas bearing.

Example II

Figure 2:
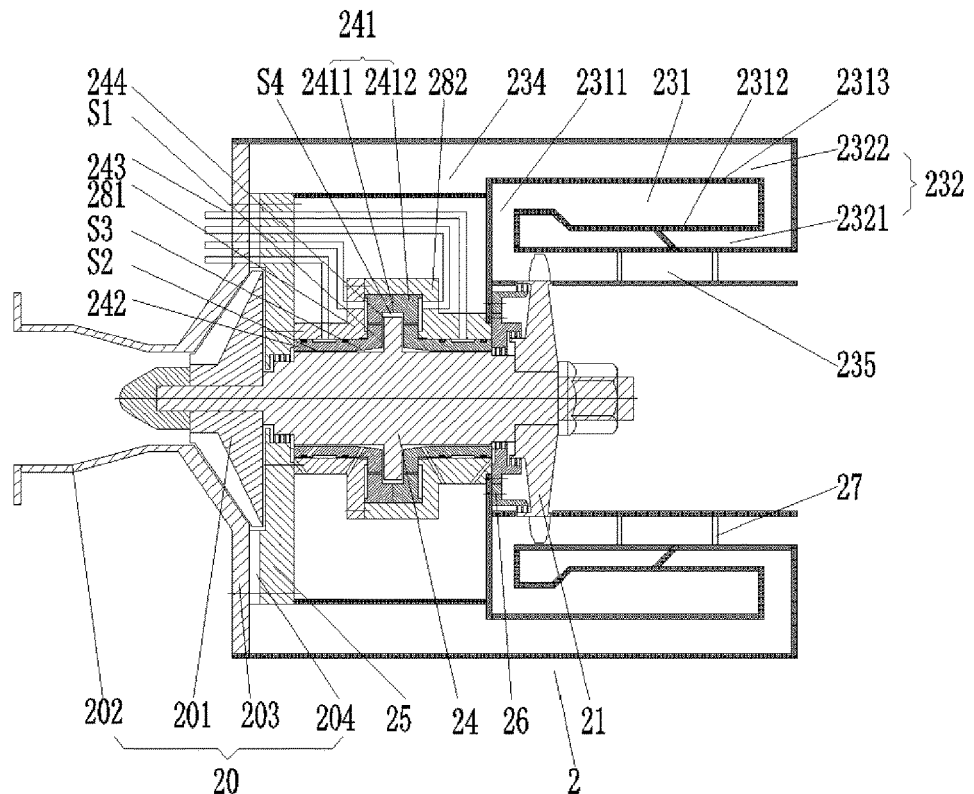
FIG. 2 is a structural schematic diagram of an embodiment II of a combined cooling heating and power micro gas turbine device.

The embodiment is seen in FIG. 2, the portion of the thrust bearing 241 close to the surface of the shaft and the portion of the radial bearing 242 close to an end surface portion of the thrust disc are connected integrally based on an embodiment I. The third radial gap S3 is a conical gap and shrinks towards the radial bearing 242.

Example III

Figure 3:
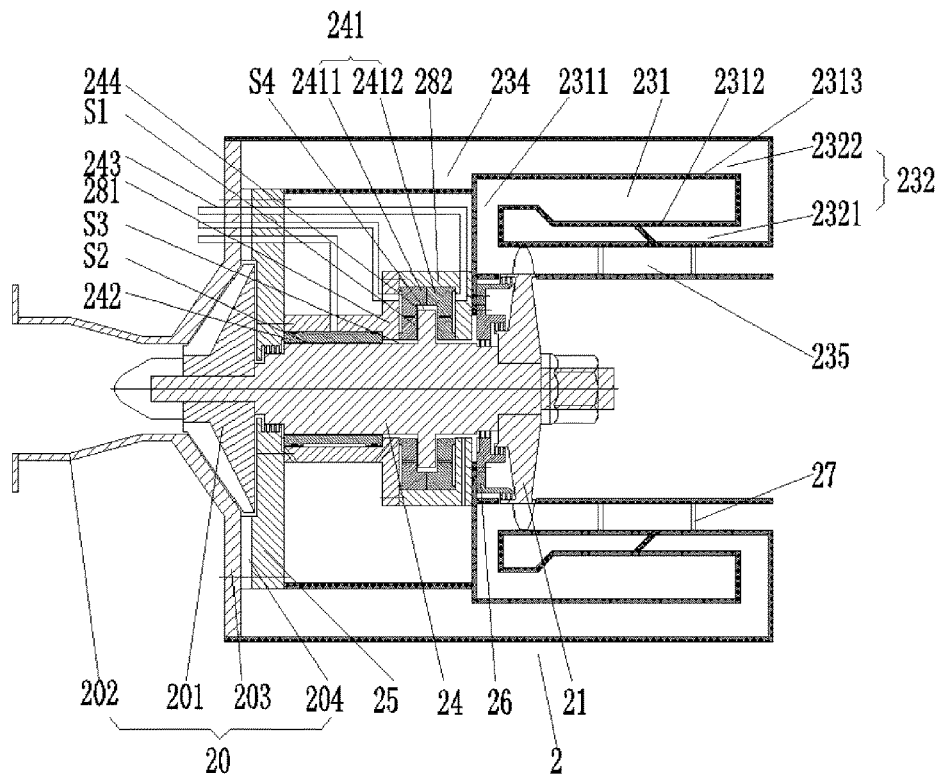
FIG. 3 is a structural schematic diagram of an embodiment III of a combined cooling heating and power micro gas turbine device.

The embodiment is seen in FIG. 3, one end of the rotating shaft 24 of the micro gas turbine 2 close to the turbine 21 is provided with the thrust disc, and the thrust disc is provided with the thrust bearing 241; and the radial bearing 242 respectively sleeves at the end of the rotating shaft 24 close to the impeller 201 of the gas compressor 20.

The thrust bearing 241 is mounted on the rotating shaft 24 and includes a first bearing body 2411 and a second bearing body 2412, the first bearing body 2411 and the second bearing body 2412 are symmetrically mounted with the thrust disc axially and have a preset first axial gap S1, outer end walls of the first bearing body 2411 and the second bearing body 2412 are respectively provided with a first air slot and a second air slot, bottoms of the first air slot and the second air slot are provided with ventilating pores, the pores are communicated with each of the air slots and the corresponding first axial gap S1, a preset third radial gap S3 is formed between an inner ring of each of the first bearing body 2411 and the second bearing body 2412 and the rotating shaft 24, and a fourth radial gap S4 is formed between a side wall of a thrust disc accommodating groove 244 enclosed by the first bearing body 2411 and the second bearing body 2412 and the side wall of the thrust disc.

The radial bearing 242 is mounted on the rotating shaft 24, an outer wall of the radial bearing is provided with an air slot, a preset second radial gap S2 is formed between the inner wall of the radial bearing 242 and the rotating shaft 24, the bottom of the air slot is provided with a ventilating pore, and the pore is communicated with the air slot and the second radial gap S2.

The micro gas turbine 2 is internally provided with an air inlet pipe 243 to supply gas to the air slots respectively and gas enters the first axial gap S1 and the second radial gap S2 respectively along the air inlet hole to form gas films.

Preferably, the thrust bearing 241 of the embodiment further includes a first bearing shell 281 and a second bearing shell 282, the first bearing shell 281 includes an end portion and a peripheral portion, the end portion thereof is mounted at one end of the first bearing body 2411 and the peripheral portion thereof covers a periphery of one radial bearing 242 hermetically; the second bearing shell 282 includes a peripheral portion and an end portion, the peripheral portion covers the peripheries of the first bearing body 2411 and the second bearing body 2412, the end portion thereof is mounted at the outer end of the second bearing body 2412, and the peripheral portion of the second bearing shell 282 is fixed to the end portion of the first bearing shell 281 axially. The first bearing shell 281 and/or the second bearing shell 282 are static parts.

The first bearing shell 281 and/or the second bearing shell 282 are provided with pressure-reducing holes.

Specifically, the thrust bearing 241 and the radial bearing 242 of the embodiment both are air bearings, and may be any one of a static pressure gas bearing, a dynamic pressure gas bearing or a dynamic and static pressure mixed gas bearing.

Example IV

Figure 4:
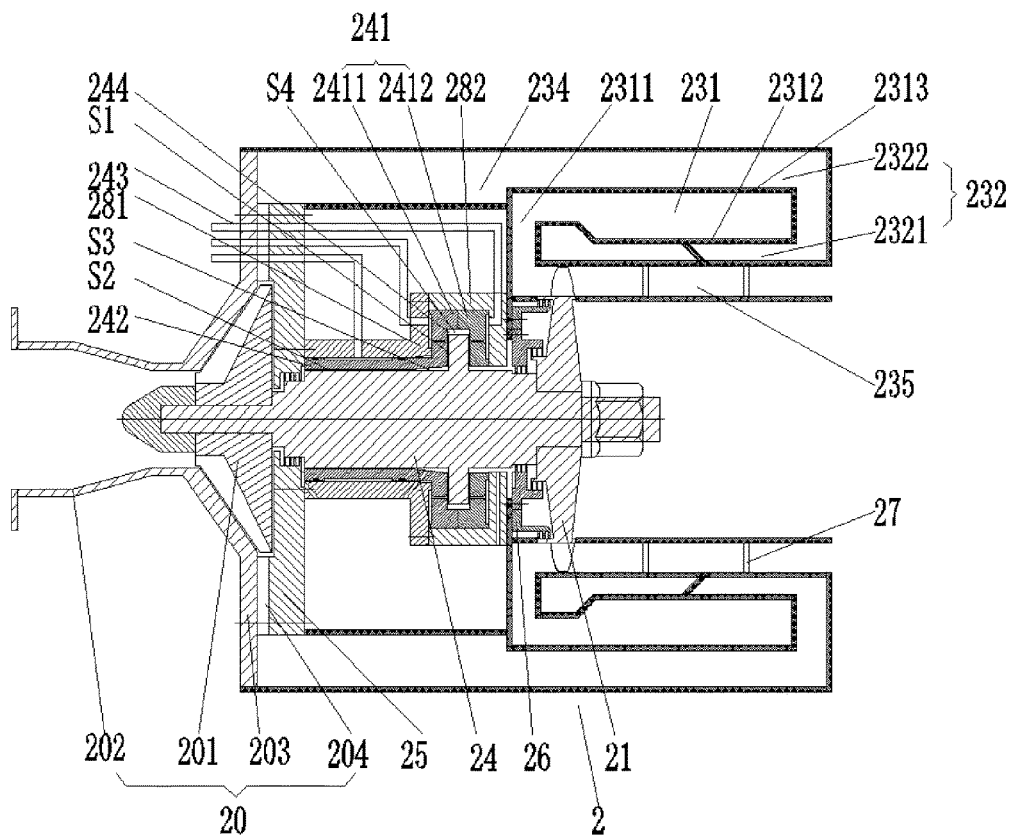
FIG. 4 is a structural schematic diagram of an embodiment IV of a combined cooling heating and power micro gas turbine device.

The embodiment is seen in FIG. 4, the portion of the thrust bearing 241 close to the surface of the shaft and the portion of the radial bearing 242 close to an end surface portion of the thrust disc are connected integrally based on an embodiment III. The third radial gap S3 is a conical gap and shrinks towards the radial bearing 242.

Example V

Figure 5:
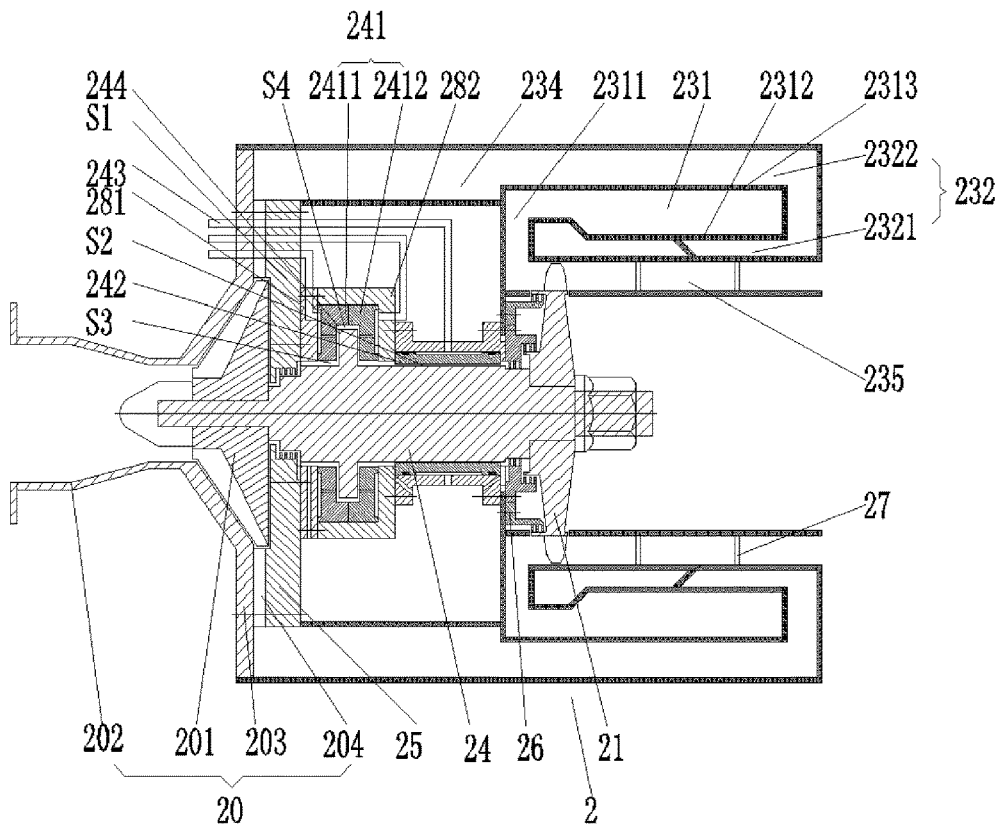
FIG. 5 is a structural schematic diagram of an embodiment V of a combined cooling heating and power micro gas turbine device.

The embodiment is seen in FIG. 5, one end of the rotating shaft 24 of the micro gas turbine 2 close to the impeller 201 of the gas compressor 20 is provided with the thrust disc, and the thrust bearing 241 sleeves the thrust disc, and the radial bearing 242 is respectively sleeved at the end of the rotating shaft 24 close to the turbine 21.

The thrust bearing 241 is mounted on the rotating shaft 24 and includes a first bearing body 2411 and a second bearing body 2412, the first bearing body 2411 and the second bearing body 2412 are symmetrically mounted with the thrust disc axially and have a preset first axial gap S1, outer end walls of the first bearing body 2411 and the second bearing body 2412 are respectively provided with a first air slot and a second air slot, bottoms of the first air slot and the second air slot are provided with ventilating pores, the pores are communicated with each of the air slots and the corresponding first axial gap S1, a preset third radial gap S3 is formed between an inner ring of each of the first bearing body 2411 and the second bearing body 2412 and the rotating shaft 24, and a fourth radial gap S4 is formed between a side wall of a thrust disc accommodating groove 244 enclosed by the first bearing body 2411 and the second bearing body 2412 and the side wall of the thrust disc.

The radial bearing 242 is mounted on the rotating shaft 24, an outer wall of the radial bearing is provided with an air slot, a preset second radial gap S2 is formed between the inner wall of the radial bearing 242 and the rotating shaft 24, the bottom of the air slot is provided with a ventilating pore, and the pore is communicated with the air slot and the second radial gap S2.

The micro gas turbine 2 is internally provided with an air inlet pipe 243 to supply gas to the air slots respectively and gas enters the first axial gap S1 and the second radial gap S2 respectively along the air inlet hole to form gas films.

Preferably, the thrust bearing 241 of the embodiment further includes a first bearing shell 281 and a second bearing shell 282, the first bearing shell 281 includes an end portion, the end portion thereof is mounted at one end of the first bearing body 2411; the second bearing shell 282 includes a peripheral portion and an end portion, the peripheral portion covers the peripheries of the first bearing body 2411 and the second bearing body 2412 and the end portion thereof is mounted at the outer end of the second bearing body 2412, and the peripheral portion of the second bearing shell 282 is fixed to the end portion of the first bearing shell 281 axially. The radial bearing 242 further includes a radial bearing shell sleeved in the periphery thereof, the radial bearing shell is fixed to the peripheral portion of the second bearing shell 282, and the first bearing shell 281 and/or the second bearing shell 282 are static parts.

The first bearing shell 281 and/or the second bearing shell 282 are provided with pressure-reducing holes.

Specifically, the thrust bearing 241 and the radial bearing 242 of the embodiment both are air bearings, and may be any one of a static pressure gas bearing, a dynamic pressure gas bearing or a dynamic and static pressure mixed gas bearing.

Example VI

Figure 6:
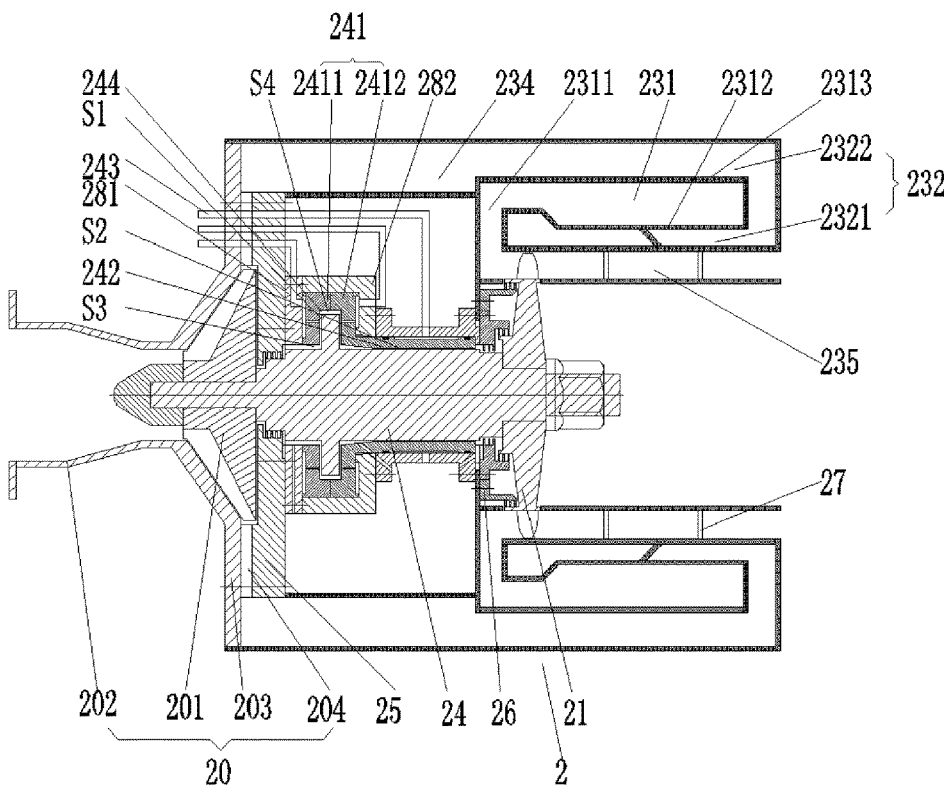
FIG. 6 is a structural schematic diagram of an embodiment VI of a combined cooling heating and power micro gas turbine device.

The embodiment is seen in FIG. 6, the portion of the thrust bearing 241 close to the surface of the shaft and the portion of the radial bearing 242 close to an end surface portion of the thrust disc are connected integrally based on an embodiment V. The third radial gap S3 is a conical gap and shrinks towards the radial bearing 242.

Example VII

Figure 7:
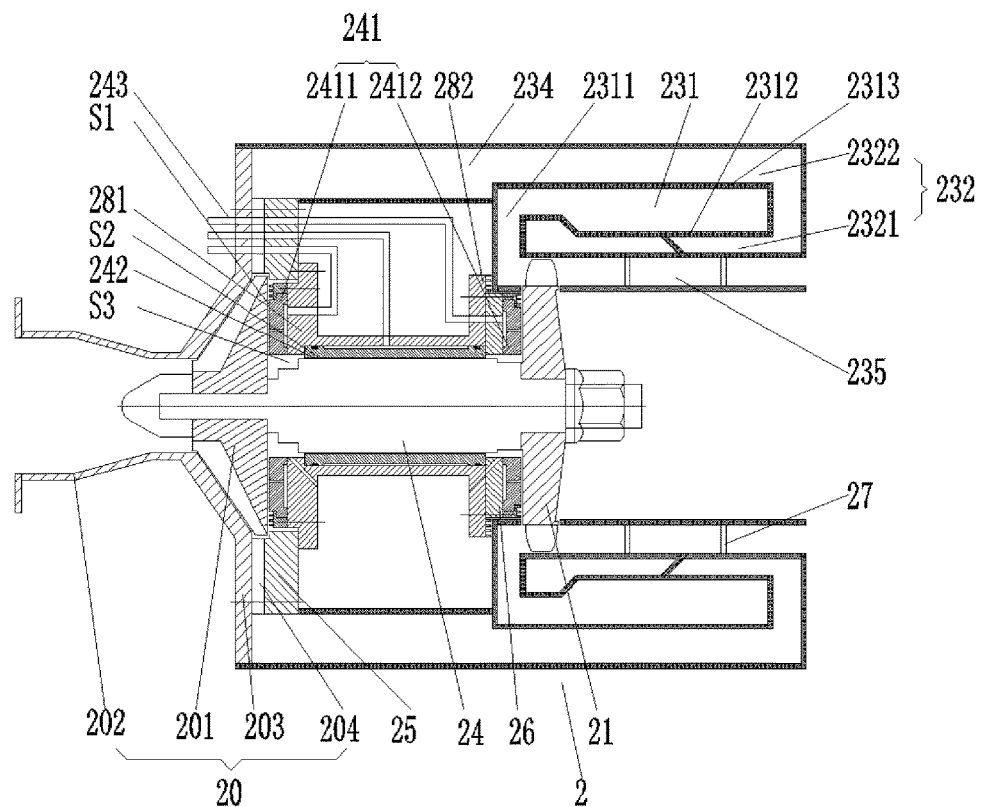
FIG. 7 is a structural schematic diagram of an embodiment VII of a combined cooling heating and power micro gas turbine device.

The embodiment is seen in FIG. 7, the rotating shaft 24 is not provided with the thrust disc, the thrust bearings 241 are sleeved at two ends of the rotating shaft 24, and a radial bearing 242 is sleeved in the middle.

The thrust bearing 241 includes the first bearing body 2411 and the second bearing body 2412, preset first axial gaps S1 are formed between the first bearing body 2411 and the impeller 201 and between the second bearing body 2412 and the turbine 21, end walls of the first bearing body 2411 and the second bearing body 2412 close to the radial bearing 242 are respectively provided with a first air slot and a second air slot, bottoms of the first air slot and the second air slot are provided with ventilating pores, the pores are communicated with the first air slot and the second air slot and the corresponding first axial gap S1, and a preset third radial gap S3 is formed between the inner ring of each of the first bearing body 2411 and the second bearing body 2412 and the rotating shaft 24.

The radial bearing 242 is mounted on the rotating shaft 24, an outer wall of the radial bearing is provided with an air slot, a preset second radial gap S2 is formed between the inner wall of the radial bearing 242 and the rotating shaft 24, the bottom of the air slot is provided with a ventilating pore, and the pore is communicated with the air slot and the second radial gap S2.

The micro gas turbine 2 is internally provided with an air inlet pipe 243 to supply gas to the air slots respectively and gas enters the first axial gap S1 and the second radial gap S2 respectively along the air inlet hole to form gas films.

Preferably, the bearing shell is further arranged out of the bearing of the embodiment, the bearing shell is integral and includes a first bearing shell 281, a second bearing shell 282 and a radial bearing shell, the first bearing shell 281 includes an end portion, the end portion thereof is mounted at one end of the first bearing body 2411; the second bearing shell 282 includes an end portion, the end portion thereof is mounted at one end of the second bearing body 2412; the radial bearing shell is sleeved in the middle section of the rotating shaft 24; and the bearing shell is a static part.

The bearing shell is provided with a pressure-reducing hole.

Specifically, the thrust bearing 241 and the radial bearing 242 of the embodiment both are air bearings, and may be any one of a static pressure gas bearing, a dynamic pressure gas bearing or a dynamic and static pressure mixed gas bearing.

Example VIII

Figure 8:
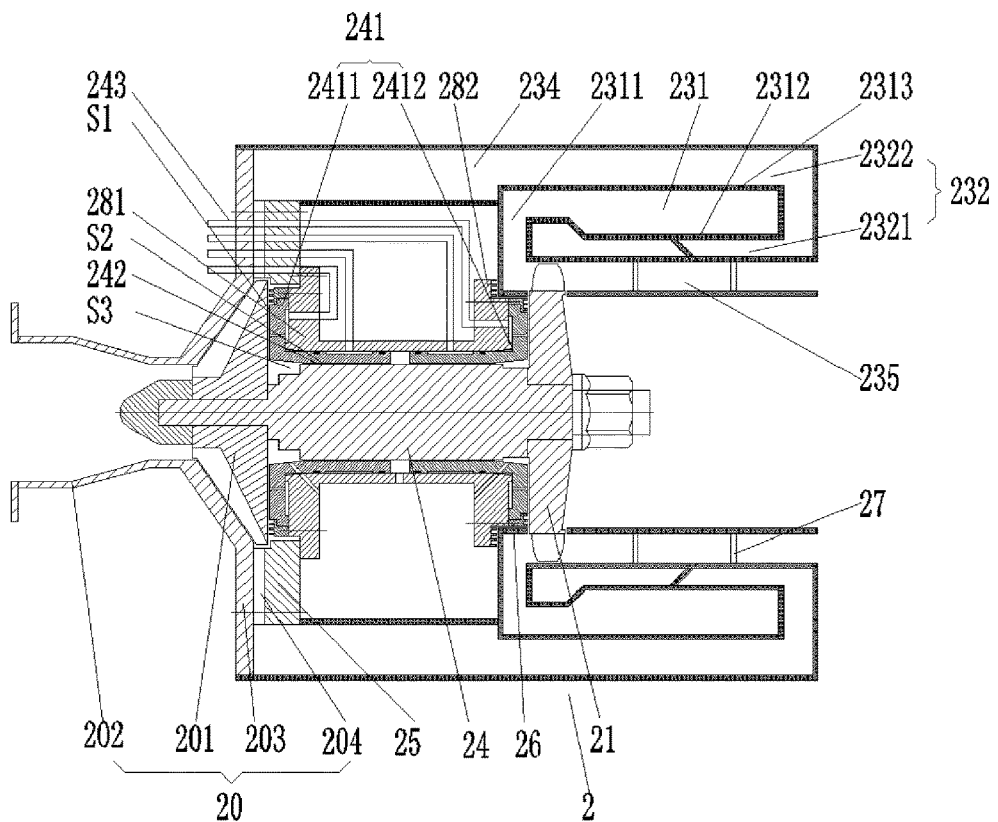
FIG. 8 is a structural schematic diagram of an embodiment VIII of a combined cooling heating and power micro gas turbine device.

The embodiment is seen in FIG. 8, the portion of the thrust bearing 241 close to the surface of the shaft and the portion of the radial bearing 242 are connected integrally based on an embodiment VII. The third radial gap S3 is a conical gap and shrinks towards the radial bearing 242.

In the structure of the embodiment of the present invention, by arranging the thrust bearing and the radial bearing reasonably, it may be ensured that the micro gas turbine 2 operates stably at the high speed.

The micro gas turbine 2 of the present invention may be connected with the heating device to heat, the heating device is provided with needed energy via the micro gas turbine 2, and the heating device is the boiler 3 or/and the electric heater 4.

Figure 9:
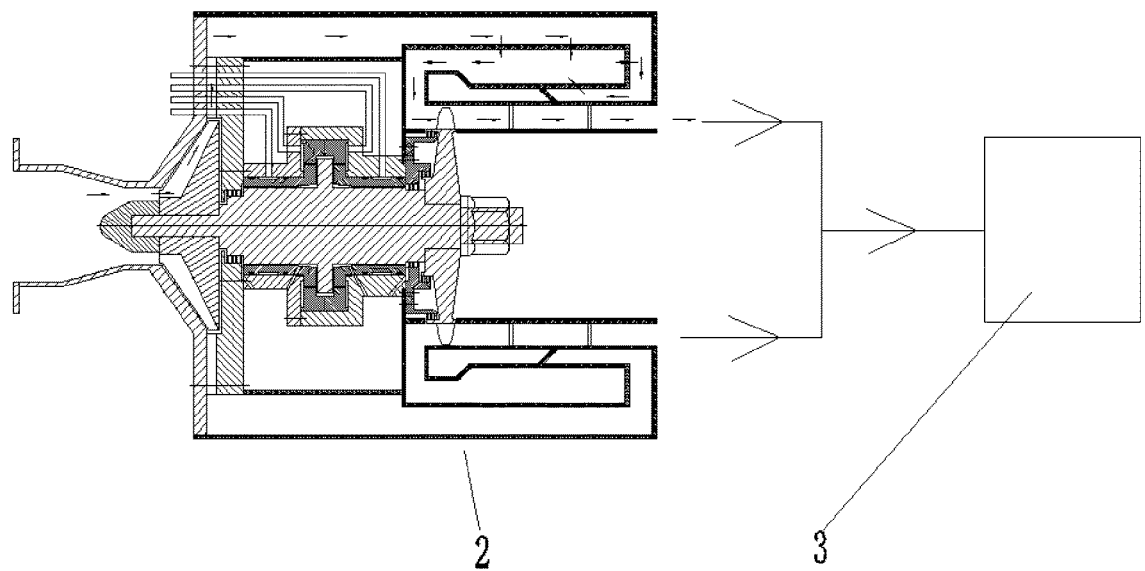
FIG. 9 is a structural schematic diagram of a combined cooling heating and power micro gas turbine device of boiler heating.

In the embodiment provided by the present invention, the heating device is the boiler 3. The structural schematic diagram of the combined cooling heating and power micro gas turbine device of boiler heating is seen in FIG. 9. Gas enters the gas compressor 20 first and then enters the combustion chamber 231 of the combustion chamber assembly after being pressurized by the gas compressor 20, a hot combustion product is sprayed out from the outlet of the combustion chamber 231, and meanwhile, the high-temperature gas pushes the turbine 21 to rotate to drive the gas compressor 20 coaxially connected therewith through the rotating shaft 24 to rotate, and the hot combustion product sprayed from the outlet of the combustion chamber 231 may provide a heat source to the boiler 3 to heat boiler water, so as to achieve a heating purpose.

Figure 10:
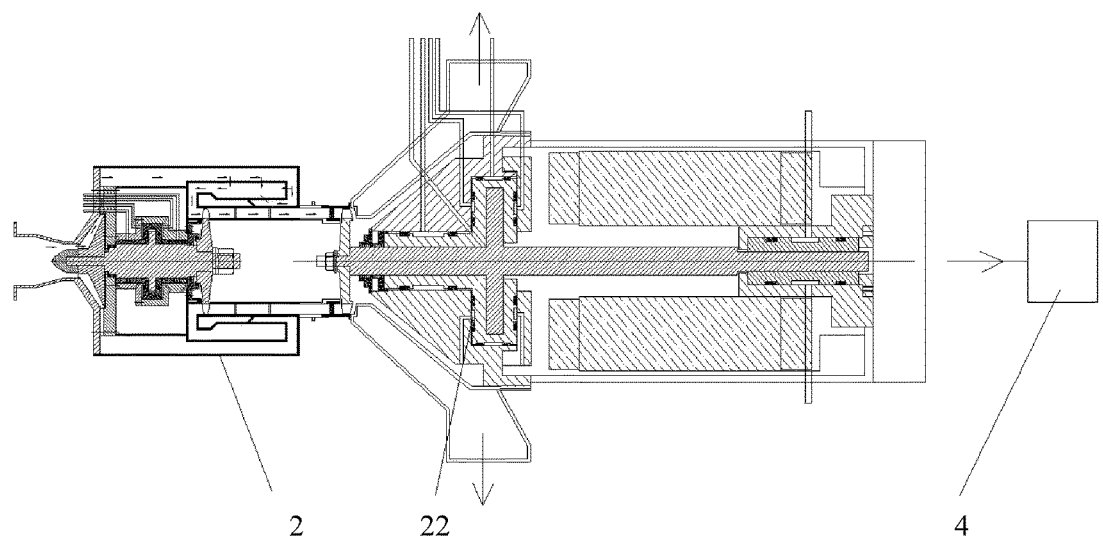
FIG. 10 is a structural schematic diagram of a combined cooling heating and power micro gas turbine device of electric heater heating.

In another embodiment provided by the present invention, the micro gas turbine 2 of the present invention is connected with a power generating device to generate electricity, and the electric heater 4 may be connected with the power generating device to heat. The power generating device is a generator 22; the generator 22 includes the rotor, a stator, a coil, a first bearing and a second bearing, the rotor penetrates through the power generating impeller, and the first bearing, the stator, the coil and the second bearing successively; the first bearing is a radial thrust integrated air bearing, including a radial portion sleeved on the rotor and a thrust portion sleeved on a thrust disc, and the thrust disc is fixed onto the rotor; and the second bearing is a radial air bearing. The structural schematic diagram of the combined cooling heating and power micro gas turbine device of electric heater heating is seen in FIG. 10. Gas enters the gas compressor 20 first and then enters the combustion chamber 231 of the combustion chamber assembly 23 to combust after being pressurized by the gas compressor 20, and a hot combustion product is sprayed out from the outlet of the combustion chamber 231. The back side of the turbine 21 in the exhaust channel 235 is further provided with a power generating impeller of the power generator 22. At the time, the high-temperature gas not only may push the turbine 21 to rotate to drive the gas compressor 20 coaxially connected therewith through the rotating shaft 24, but also may push the power generating impeller to rotate so as to product work to generate electricity so as to provide a power supply to the electric heater 4. The electric heater 4 heats to achieve a heating purpose, and residual high-temperature gas is exhausted from the exhaust channel 235.

Figure 18:
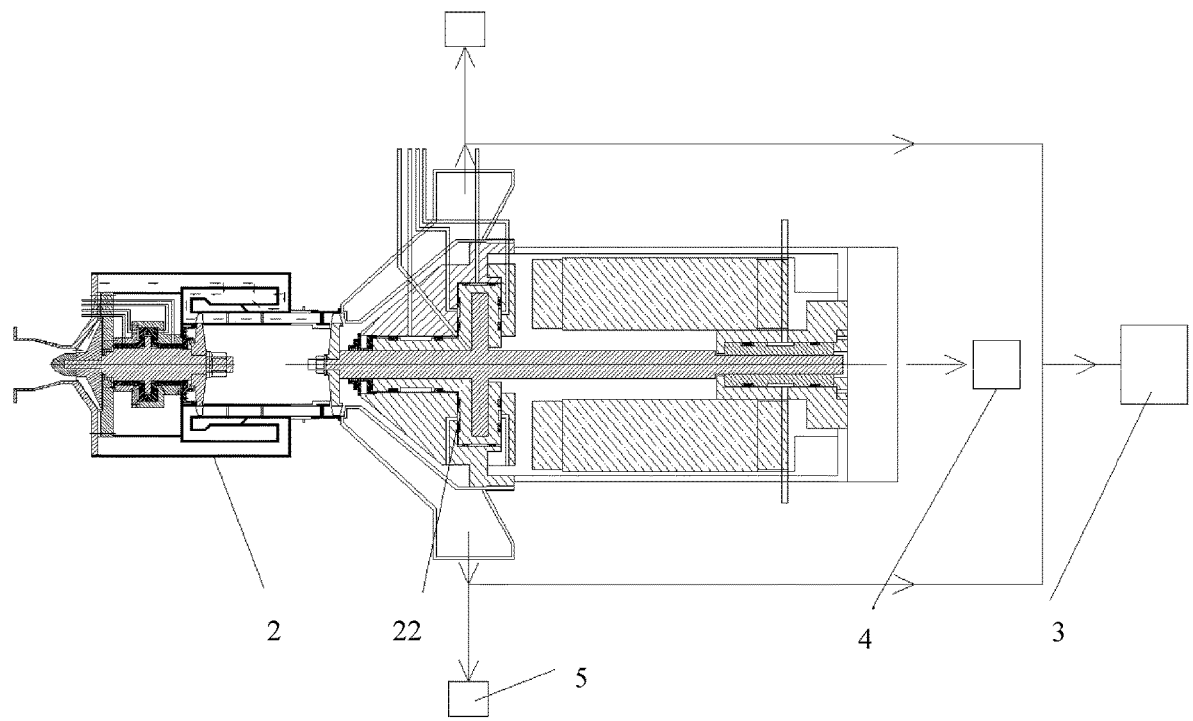
FIG. 18 is a structural schematic diagram of a combined cooling heating and power device.

Further, referring to FIG. 18, residual high-temperature gas is exhausted from the exhaust channel 235, so that the high-temperature gas may be further recovered to the refrigerating device 5 to refrigerate, the refrigerating device being a lithium bromide refrigerating unit, an alcohol refrigerating device or a steam refrigerator. During refrigeration, a refrigerant changes in phase to absorb heat and refrigerate, and the lithium bromide refrigerating unit, the alcohol refrigerating device or the steam refrigerator are refrigerating devices in the prior art, so that the specific working process in the present invention is no longer described in detail.

Figure 11:
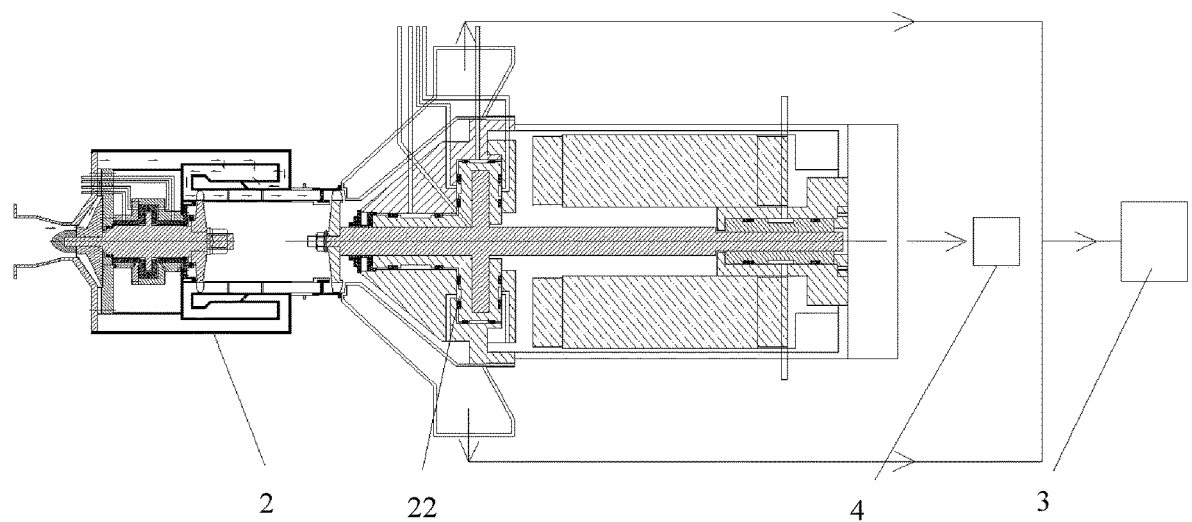
FIG. 11 is a structural schematic diagram of a combined cooling heating and power micro gas turbine device of heating by combined heating and power.

In another embodiment provided by the present invention, the heating device is the boiler 3, the generator 22 and the electric heater 4. The structural schematic diagram of the combined cooling heating and power micro gas turbine device of heating by combined heating and power is seen in FIG. 11. Gas enters the gas compressor 20 first and then enters the combustion chamber 231 of the combustion chamber assembly 23 to combust after being pressurized by the gas compressor 20, and a hot combustion product is sprayed out from the outlet of the combustion chamber 231. The back side of the turbine 21 in the exhaust channel 235 is further provided with a power generating impeller of the power generator 22. At the time, the high-temperature gas not only may push the turbine 21 to rotate to drive the gas compressor 20 coaxially connected therewith through the rotating shaft 24, but also may push the power generating impeller to rotate so as to product work to generate electricity so as to provide a power supply to the electric heater 4. The electric heater 4 heats to achieve a heating purpose, and the residual high-temperature gas is exhausted from the exhaust channel 235 to the boiler to provide the heat source to the boiler 3 so as to heat the boiler water, thereby achieving a heating purpose. Therefore, combined power and heating role is played.

According to the heat supply model designed in the present invention, under the 100 kW heat supply experimental condition, stable operation may be realized. Noise of an operating room of a laboratory actually measured is 70 db, NOx emission actually measured is 10 ppm which is ⅕ of an emission standard of a power plant and ⅒ of an emission standard of the boiler; and HC emission actually measured is 0 and the combustion efficiency is about 99.8%. Meanwhile, an experimental result shows that the combined cooling heating and power micro gas turbine device of the present invention is extremely high in combustion efficiency, reaches the standard in noise emission and pollutant emission, and is far higher than the requirement of the emission standard of other heat supply systems in industry.

The embodiments of the present invention further provide a related structure of a rotor system of the generator.

In an embodiment provided by the present invention, the rotor system of the generator 22 includes a turbine shaft for mounting the power generating impeller 222 and a motor shaft for mounting a motor body 221, the impeller shaft and the motor shaft are connected via a coupling, a first bearing 223 and a second bearing 224 are arranged between the power generating impeller 222 and the coupling, and the motor shaft and the motor body 221 are rotatably connected via a third bearing 225 and a fourth bearing 226.

The power generating impeller 222 has a longer axle base, and the power generating impeller 222 is connected with the motor shaft via the coupling. In this way, heat at the end of the power generating impeller 222 may be isolated, a larger axial thrust at the end of the power generating impeller 222 may be carried, and meanwhile, it is convenient to arrange a flue space at the end of the power generating impeller 222, and compared with the way of connecting the power generating impeller 222 to the motor body 221 via an integral shaft, the shaft system structure has higher stability. In addition, it is convenient to replace and maintain components of the bearing in the connecting mode.

In the structure of the embodiment, a first cartridge receiver and a second cartridge receiver may further be arranged, and the first cartridge receiver and the second cartridge receiver are connected via a coupling. The first bearing 223, the second bearing 224 and the power generating impeller 222 are arranged in the first cartridge receiver, and the motor body 221, the third bearing 225 and the fourth bearing 226 are arranged in the second cartridge receiver.

Figure 12:
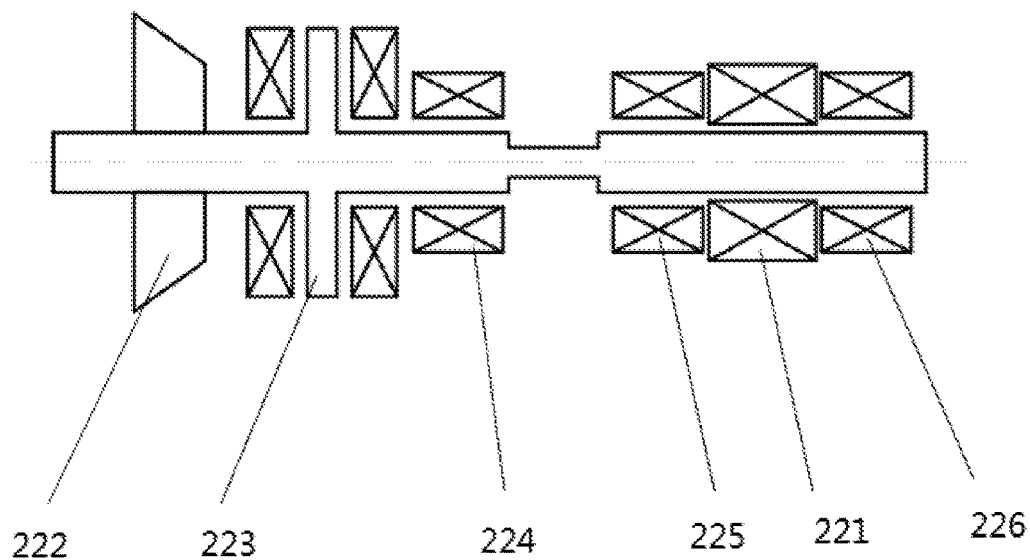
FIG. 12 is a structural schematic diagram I of a rotor structure of a motor when an electric heater or a combined heat and power supply mode to heat.

In a specific structure provided by the embodiment, as shown in FIG. 12, the rotor system of the generator 22 includes the thrust bearing, the first radial bearing, the second radial bearing and the third radial bearing that are arranged successively, the thrust bearing is arranged in a position, close to the power generating impeller 222, between the power generating impeller 222 and the coupling, the first radial bearing is arranged in a position, close to the coupling, between the power generating impeller 222 and the coupling, the second radial bearing is arranged on one side of the motor body 221 close to the power generating impeller 222, and the third radial bearing is arranged on the other side of the motor body 221 away from the power generating impeller 222.

Figure 13:
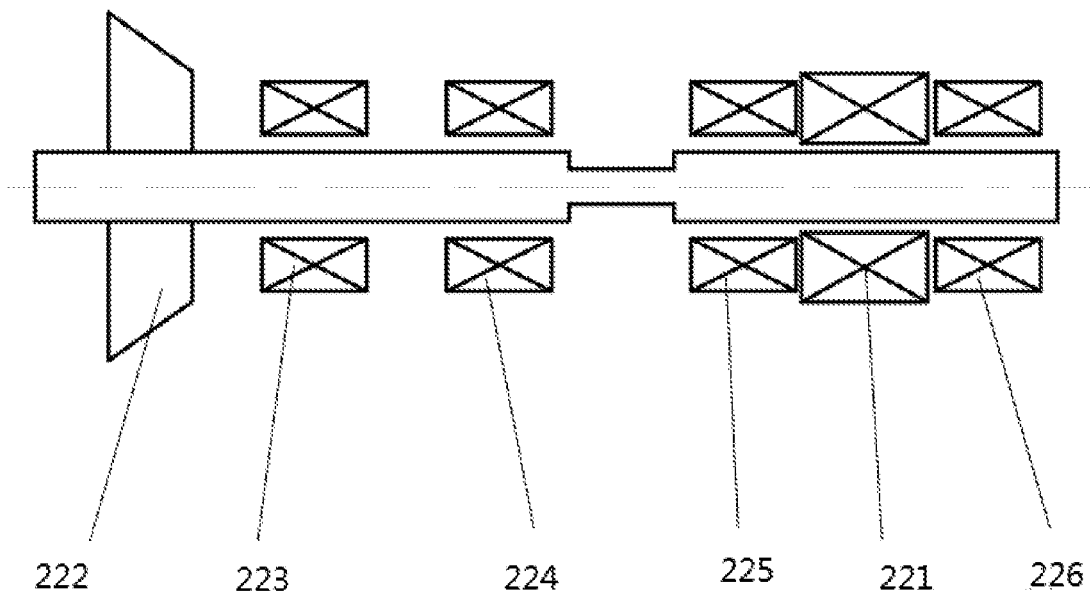
FIG. 13 is a structural schematic diagram II of a rotor structure of a motor when an electric heater or a combined heat and power supply mode to heat.

In another specific structure provided by the embodiment, as shown in FIG. 13, the rotor system of the generator 22 includes the first radial bearing, the thrust bearing, the second radial bearing and the third radial bearing that are arranged successively, the first radial bearing is arranged in a position, close to the power generating impeller 222, between the power generating impeller 222 and the coupling, the thrust bearing is arranged in a position, close to the coupling, between the power generating impeller 222 and the coupling, the second radial bearing is arranged on one side of the motor body 221 close to the power generating impeller 222, and the third radial bearing is arranged on the other side of the motor body 221 away from the power generating impeller 222.

In addition, the third and fourth bearings may be further arranged as the thrust bearings in the embodiment, and corresponding bearing types are arranged, which is no longer described in detail.

Further, the thrust bearing is a gas-magnetic mixed thrust bearing or an air thrust bearing or a magnetic bearing, the first radial bearing is a gas dynamic and static pressure mixed radial bearing or a gas-magnetic mixed radial bearing, and the second radial bearing and the third radial bearing may both be gas dynamic and static pressure mixed radial bearings or gas-magnetic mixed radial bearings or ball bearings.

As the power generating impeller 222 is arranged in the exhaust channel 235, it is necessary to arrange a non-contact bearing on the impeller shaft to isolate heat in the exhaust channel 235 effectively so as to prevent heat from being transferred to the motor shaft to lead to damage of the motor, thereby improving the reliability and the safety of the power generation system of the gas turbine. The impeller shaft and the motor shaft transfer power respectively and are connected via the coupling, so that it is convenient to dismantle and assemble the generator 22. The bearing force of each shaft may be decomposed effectively, so that deformation of the rotating shaft due to too long axle base is prevented.

As a preferred structure, the thrust bearing and the first radial bearing may be arranged as integral bearings which not only play a radial supporting role, but also play an axial supporting role.

Figure 14:
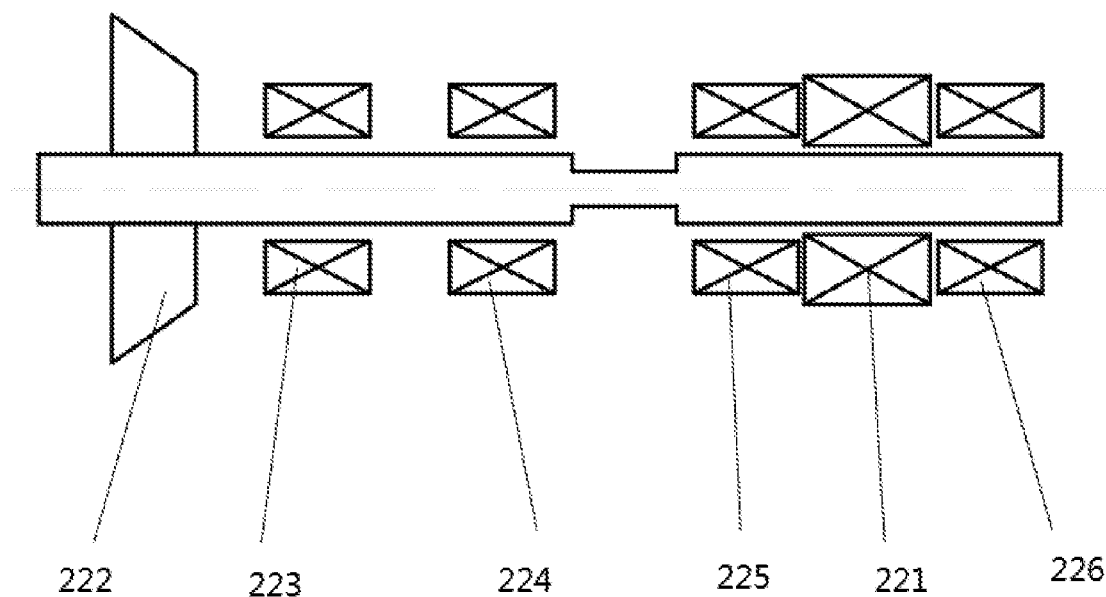
FIG. 14 is a structural schematic diagram III of a rotor structure of a motor when an electric heater or a combined heat and power supply mode to heat.

In another specific structure provided by the embodiment, as shown in FIG. 14, the rotor system of the generator 22 includes the first radial bearing, the second radial bearing, the third radial bearing and the fourth radial bearing that are arranged successively, the first radial bearing is arranged in a position, close to the power generating impeller 222, between the power generating impeller 222 and the coupling, the second radial bearing is arranged in a position, close to the coupling, between the power generating impeller 222 and the coupling, the third radial bearing is arranged on one side of the motor body 221 close to the power generating impeller 222, and the fourth radial bearing is arranged on the other side of the motor body 221 away from the power generating impeller 222.

Further, the first radial bearing and the second radial bearing are ball bearings or air bearings, the third radial bearing and the fourth radial bearing are gas dynamic and static pressure mixed radial bearings or gas-magnetic mixed radial bearings or ball bearings, and the first radial bearing and the second radial bearing may counteract the axial force and play roles of the radial bearing and the thrust bearing.

In addition, the third and fourth bearings may be further arranged as the thrust bearings in the structure, and corresponding bearing types are arranged, which is no longer described in detail.

In an embodiment provided by the present invention,

The rotor system of the generator 22 includes a rotating shaft of the motor, the rotating shaft of the motor is an integral rotating shaft, the rotating shaft of the motor is provided with the power generating impeller 222 and the motor body 221, the first bearing 223 and the second bearing 224 are arranged between the power generating impeller 222 and the motor body 221, and the side of the motor body 221 away from the power generating impeller 222 is provided with the third bearing 225.

Figure 15:
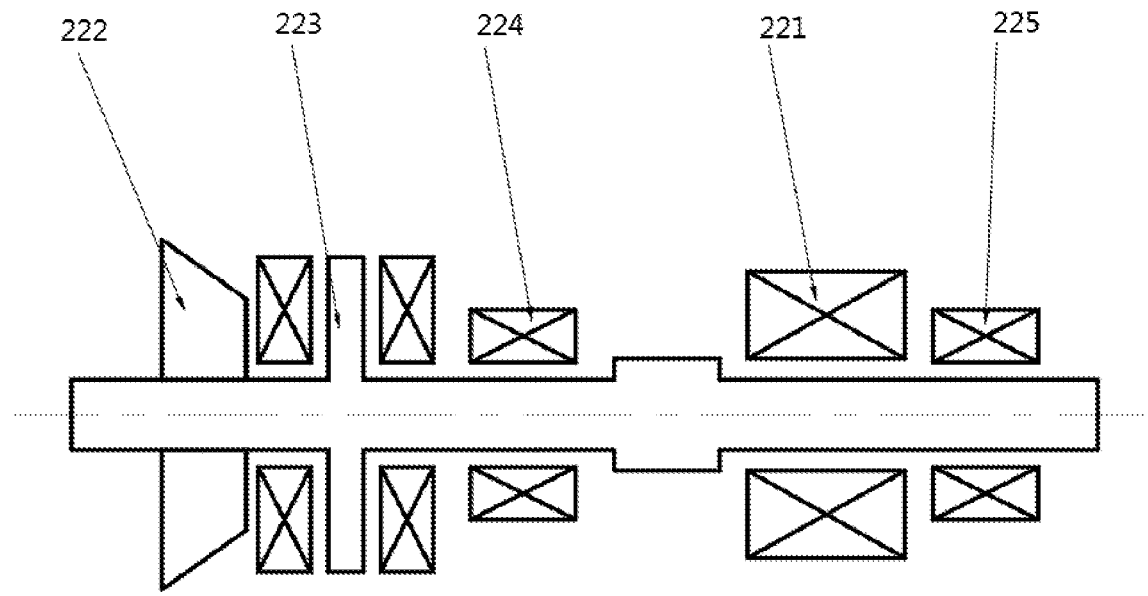
FIG. 15 is a structural schematic diagram IV of a rotor structure of a motor when an electric heater or a combined heat and power supply mode to heat.

In a specific structure provided by the embodiment, as shown in FIG. 15, the rotor system of the generator 22 includes the thrust bearing, the first radial bearing and the second radial bearing arranged on the rotating shaft of the motor successively.

Figure 16:
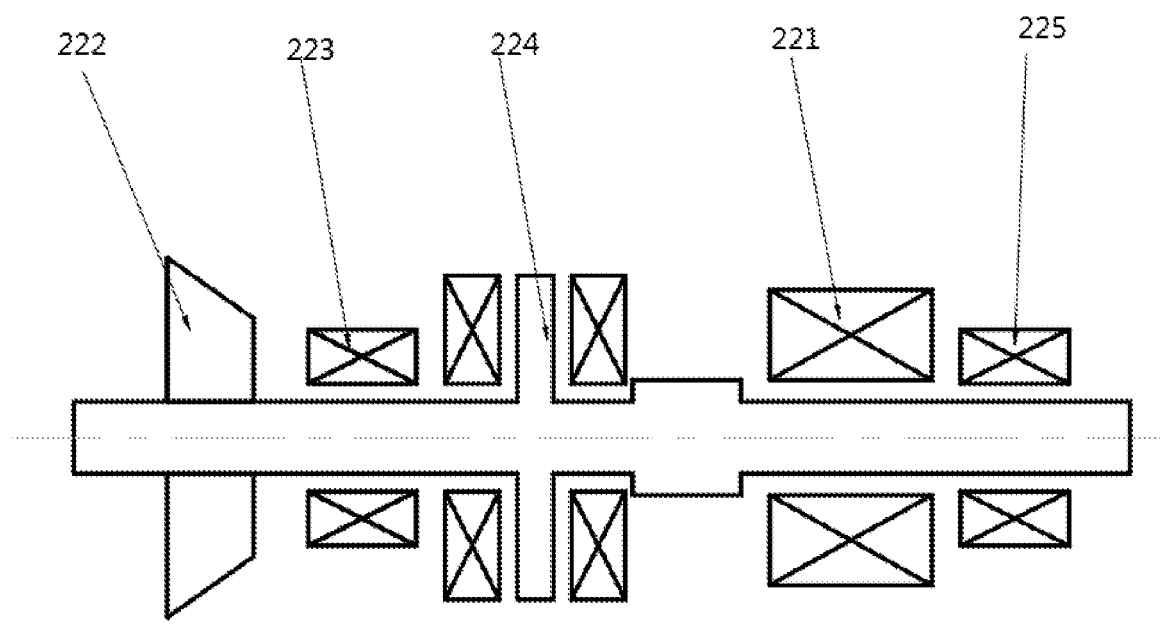
FIG. 16 is a structural schematic diagram V of a rotor structure of a motor when an electric heater or a combined heat and power supply mode to heat.

In another specific structure provided by the embodiment, as shown in FIG. 16, the rotor system includes the first radial bearing, the thrust bearing and the second radial bearing arranged on the rotating shaft of the motor successively.

Preferably, the thrust bearing and the first radial bearing are non-contact bearings, and the second radial bearing is a non-contact bearing or a contact bearing.

Further, the thrust bearing is a gas-magnetic mixed thrust bearing or an air thrust bearing or a magnetic bearing, the first radial bearing is a gas dynamic and static pressure mixed radial bearing or a gas-magnetic mixed radial bearing, and the second radial bearings may be gas dynamic and static pressure mixed radial bearings or gas-magnetic mixed radial bearings or ball bearings.

Figure 17:
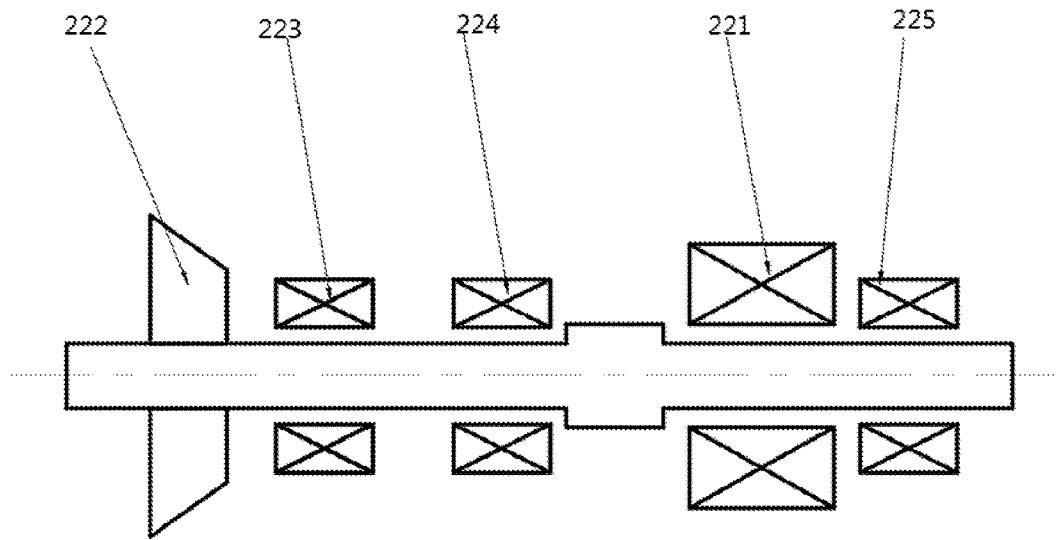
FIG. 17 is a structural schematic diagram VI of a rotor structure of a motor when an electric heater or a combined heat and power supply mode to heat.

In another specific structure provided by the embodiment, as shown in FIG. 17, the rotor system of the generator 22 includes the first radial bearing, the second bearing and the third radial bearing arranged on the rotating shaft of the motor successively.

Further, the first radial bearing and the second radial bearing are ball bearings or air bearings, the third radial bearing is a gas dynamic and static pressure mixed radial bearing or a gas-magnetic mixed radial bearing or a ball bearing, and the first radial bearing and the second radial bearing may counteract the axial force and play roles of the radial bearing and the thrust bearing.

In the rotor system of the embodiment, the power generating impeller 222 is low in rotating speed. Compared with a conventional integrated high speed micro gas turbine, the radial load and the radial thrust of the rotating shaft are decreased greatly. The requirement on the strength of the rotating shaft is further reduced, so that the power generating impeller 222 and the motor body 221 may be connected by using the integrated rotating shaft, and therefore, the quantity of the components is decreased and the design reliability is improved.

The above description is merely description of preferred embodiments of the application and applied technical principles. Those skilled in the art shall understand that the scope of the application in the present invention is not limited to the technical scheme specifically combined by the technical characteristics and shall cover other technical schemes formed by combining the technical characteristics or equivalent characteristics thereof without departing the concept of the present invention. For example, the characteristics have similar functions with those disclosed (but not limited to) in the application.

What is claimed is:

1. A combined cooling heating and power micro gas turbine device, comprising a micro gas turbine,
    wherein the micro gas turbine comprises a gas compressor, a turbine and a combustion chamber assembly;
    the combustion chamber assembly comprises a combustion chamber, an air inlet cavity, an air inlet channel and an exhaust channel, the air inlet cavity comprises an interior air inlet cavity and an exterior air inlet cavity, and the interior air inlet cavity and the exterior air inlet are integrated, an air outlet end of the exterior air inlet cavity is communicated with an air inlet end of the interior air inlet cavity, an air inlet end of the exterior air inlet cavity is communicated with the air inlet channel, the air inlet channel is communicated with an air outlet end of the gas compressor, the combustion chamber is arranged between the interior air inlet cavity and the exterior air inlet cavity, and an air outlet of the combustion chamber is communicated with the exhaust channel;
    an impeller of the gas compressor is coaxially connected to the turbine through a rotating shaft, and a rim of the turbine stretches into the exhaust channel; and
    the rotating shaft is rotatably mounted in an air bearing, wherein the turbine is an axial flow turbine, and a rim of the axial flow turbine is perpendicular to the exhaust channel.

2. The combined cooling heating and power micro gas turbine device according to claim 1, wherein the micro gas turbine device is connected to a heating device to supply heat, and the heating device is communicated with an air outlet end of the exhaust channel of the combustion chamber assembly.

3. The combined cooling heating and power micro gas turbine device according to claim 1, wherein the micro gas turbine device is connected to a refrigerating device to refrigerate, and the refrigerating device is communicated with an air outlet end of the exhaust channel of the combustion chamber assembly.

4. The combined cooling heating and power micro gas turbine device according to claim 1, wherein the micro gas turbine device is connected to a power generating device to generate electricity; and the power generating device comprises a power generating impeller, the power generating impeller stretches into the exhaust channel to be pushed to rotate by an exhausted gas, and a rotation of the power generating impeller drives a rotor of the power generating device to rotate to generate electricity.

5. The combined cooling heating and power micro gas turbine device according to claim 4, wherein the power generating device is a generator; the generator comprises the rotor, a stator, a coil, a first bearing, and a second bearing, the rotor penetrates through the generating impeller, the first bearing, the stator, the coil, and the second bearing successively; the first bearing is a radial thrust integrated air bearing, comprising a radial portion sleeved on the rotor and a thrust portion sleeved on a thrust disc, and the thrust disc is fixed onto the rotor; and the second bearing is a radial air bearing.

6. The combined cooling heating and power micro gas turbine device according to claim 1, wherein the interior air inlet cavity and the exterior air inlet cavity are both annular, and the air outlet end at a tail end of the exterior air inlet cavity is communicated with the air inlet end of the interior air inlet cavity in a rewinding manner and encloses the combustion chamber;
    a radial inner wall of the combustion chamber and a radial outer wall of the combustion chamber are provided with pores, and the radial inner wall and the radial outer wall respectively separate the combustion chamber from the interior air inlet cavity and the exterior air inlet cavity;
    the exhaust channel is annular, and the exhaust channel is arranged around an axis of the rotating shaft, and the air outlet of the combustion chamber is arranged in a front side of a turbine on a front portion of the exhaust channel.

7. The combined cooling heating and power micro gas turbine device according to claim 1, wherein the air inlet channel is arranged around the rotating shaft, and the air inlet cavity, the combustion chamber, and the exhaust channel are arranged around the turbine; and
    diameters of the combustion chamber close to the air outlet of the combustion chamber are decreased gradually.

8. The combined cooling heating and power micro gas turbine device according to claim 1, wherein one end of the rotating shaft close to the turbine is provided with a thrust disc, and the air bearing comprises a thrust bearing sleeved on the thrust disc and a radial bearing sleeved at an end of the rotating shaft close to the impeller of the gas compressor;
    the thrust bearing comprises a first bearing body and a second bearing body, the first bearing body and the second bearing body are symmetrically mounted with the thrust disc axially, and the first bearing body and the second bearing body have a preset first axial gap, an outer end wall of the first bearing body and an outer end wall of the second bearing body are respectively provided with a first air slot and a second air slot, a bottom of the first air slot and a bottom of the second air slot are provided with first ventilating pores, the first ventilating pores are communicated with each of the first air slot and the second air slot and the preset first axial gap, a preset third radial gap is formed between an inner ring of the first bearing body and the rotating shaft, and between an inner ring of the second bearing body and the rotating shaft, and a preset fourth radial gap is formed between a side wall of a thrust disc accommodating groove enclosed by the first bearing body and the second bearing body and a side wall of the thrust disc; and an outer wall of the radial bearing is provided with an air slot, a preset second radial gap is formed between an inner wall of the radial bearing and the rotating shaft, a bottom of the air slot is provided with a second ventilating pore, and the second ventilating pore is communicated with the air slot and the preset second radial gap.

9. The combined cooling heating and power micro gas turbine device according to claim 8, the thrust bearing further comprises a first bearing shell and a second bearing shell, the first bearing shell comprises an end portion and a peripheral portion, the end portion of the first bearing shell is mounted at one end of the first bearing body and the peripheral portion of the first bearing shell covers a periphery of the radial bearing hermetically;

the second bearing shell comprises a peripheral portion and an end portion, the peripheral portion of the second bearing shell covers a periphery of the first bearing body and a periphery of the second bearing body, and the end portion of the second bearing shell is mounted at an outer end of the second bearing body; and the peripheral portion of the second bearing shell is fixedly connected to the end portion of the first bearing shell axially, and the first bearing shell and/or the second bearing shell are static parts.

10. The combined cooling heating and power micro gas turbine device according to claim 1, wherein an end of the rotating shaft close to the impeller of the gas compressor is provided with a thrust disc, and the air bearing comprises a thrust bearing sleeved on the thrust disc and a radial bearing sleeved at an end of the rotating shaft close to the turbine;

the thrust bearing comprises a first bearing body and a second bearing body, the first bearing body and the second bearing body are symmetrically mounted with the thrust disc axially, and the first bearing body and the second bearing body have a preset first axial gap, an outer end wall of the first bearing body and an outer end wall of the second bearing body are respectively provided with a first air slot and a second air slot, a bottom of the first air slot and a bottom of the second air slot are provided with first ventilating pores, the first ventilating pores are communicated with each of the first air slot and the second air slot and the preset first axial gap, a preset third radial gap is formed between an inner ring of the first bearing body and the rotating shaft, and between an inner ring of the second bearing body and the rotating shaft, and a preset fourth radial gap is formed between a side wall of a thrust disc accommodating groove enclosed by the first bearing body and the second bearing body and a side wall of the thrust disc; and an outer wall of the radial bearing is provided with an air slot, a preset second radial gap is formed between an inner wall of the radial bearing and the rotating shaft, a bottom of the air slot is provided with a second ventilating pore, and the second ventilating pore is communicated with the air slot and the preset second radial gap.

11. The combined cooling heating and power micro gas turbine device according to claim 10, wherein the thrust bearing further comprises a first bearing shell and a second bearing shell, the first bearing shell comprises an end portion, and the end portion of the first bearing shell is mounted at one end of the first bearing body;

the second bearing shell comprises a peripheral portion and an end portion, the peripheral portion of the second bearing shell covers a periphery of the first bearing body and a periphery of the second bearing body, and the end portion of the second bearing shell is mounted at an outer end of the second bearing body; and the peripheral portion of the second bearing shell is fixedly connected to the end portion of the first bearing shell axially;

the radial bearing further comprises a radial bearing shell sleeving a periphery of the radial bearing, and the radial bearing shell is fixedly connected to a periphery portion of the second bearing shell; and the first bearing shell and/or the second bearing shell are static parts.

12. The combined cooling heating and power micro gas turbine device according to claim 1, wherein the air bearing comprises a thrust bearing sleeved on the rotating shaft and a radial bearing sleeved on a middle portion of the rotating shaft;

the thrust bearing comprises a first bearing body and a second bearing body, preset first axial gaps are formed between the first bearing body and the impeller, and between the second bearing body and the turbine, an end wall of the first bearing body close to the radial bearing and an end wall of the second bearing body close to the radial bearing are respectively provided with a first air slot and a second air slot, a bottom of the first air slot and a bottom of the second air slot are provided with first ventilating pores, the first ventilating pores are communicated with the first air slot and the second air slot and the preset first axial gaps, and a preset third radial gap is formed between an inner ring of the first bearing body and the rotating shaft, and between an inner ring of the second bearing body and the rotating shaft; and an outer wall of the radial bearing is provided with an air slot, a preset second radial gap is formed between an inner wall of the radial bearing and the rotating shaft, a bottom of the air slot is provided with a second ventilating pore, and the second ventilating pore is communicated with the air slot and the preset second radial gap.

13. The combined cooling heating and power micro gas turbine device according to claim 12, wherein an integrated bearing shell is further arranged out of the air bearing, and the integrated bearing shell comprises a first bearing shell, a second bearing shell, and a radial bearing shell;

the first bearing shell comprises an end portion, and the end portion the first bearing shell is mounted at one end of the first bearing body;

the second bearing shell comprises an end portion, and the end portion the second bearing shell is mounted at one end of the second bearing body;

the radial bearing shell is sleeved on a middle section of the rotating shaft; and the integrated bearing shell is a static part.

14. The combined cooling heating and power micro gas turbine device according to claim 2, wherein the heating device comprises a boiler; and the boiler is connected to the exhaust channel, and the boiler is heated by a combustion product sprayed by the exhaust channel.

15. The combined cooling heating and power micro gas turbine device according to claim 3, wherein the refrigerating device is a lithium bromide refrigerating unit, an alcohol refrigerating device, or a steam refrigerator.

16. A combined cooling heating and power micro gas turbine device, comprising a micro gas turbine,
- wherein the micro gas turbine comprises a gas compressor, a turbine and a combustion chamber assembly;
- the combustion chamber assembly comprises a combustion chamber, an air inlet cavity, an air inlet channel and an exhaust channel, the air inlet cavity comprises an interior air inlet cavity and an exterior air inlet cavity, and the interior air inlet cavity and the exterior air inlet are integrated, an air outlet end of the exterior air inlet cavity is communicated with an air inlet end of the interior air inlet cavity, an air inlet end of the exterior air inlet cavity is communicated with the air inlet channel, the air inlet channel is communicated with an air outlet end of the gas compressor, the combustion chamber is arranged between the interior air inlet cavity and the exterior air inlet cavity, and an air outlet of the combustion chamber is communicated with the exhaust channel;
- an impeller of the gas compressor is coaxially connected to the turbine through a rotating shaft, and a rim of the turbine stretches into the exhaust channel; and
- the rotating shaft is rotatably mounted in an air bearing, wherein the gas compressor further includes an air inlet barrel and a back end cover, and the air inlet barrel and the back end cover are integrated; the impeller is fixed to a front end of the rotating shaft in a sleeving manner;
- a front fixed end cover is sleeved on a position of the rotating shaft close to the impeller, an air outlet channel of the gas compressor is formed in a gap between the front fixed end cover and the back end cover, and the air outlet channel and the air inlet barrel are communicated with the air inlet channel of the combustion chamber assembly;
- the air inlet channel of the combustion chamber assembly is fixed to an edge of the front fixed end cover at a front end of an inner side wall of the air inlet channel of the combustion chamber assembly, and an outer side wall of the air inlet channel of the combustion chamber assembly is fixed to an edge of the back end cover; and
- a back fixed end cover is sleeved on a position of the rotating shaft close to the turbine, and a connecting arm of the combustion chamber assembly close to the back fixed end cover is fixedly connected to the back fixed end cover.

17. The combined cooling heating and power micro gas turbine device according to claim 16, wherein sealing members are arranged between the rim of the turbine and the exhaust channel, between the rotating shaft and the front fixed end cover, between the rotating shaft and the back fixed end cover, and between the turbine and the back fixed end cover to seal.

18. A combined cooling heating and power micro gas turbine device, comprising a micro gas turbine,
- wherein the micro gas turbine comprises a gas compressor, a turbine and a combustion chamber assembly;
- the combustion chamber assembly comprises a combustion chamber, an air inlet cavity, an air inlet channel and an exhaust channel, the air inlet cavity comprises an interior air inlet cavity and an exterior air inlet cavity, and the interior air inlet cavity and the exterior air inlet are integrated, an air outlet end of the exterior air inlet cavity is communicated with an air inlet end of the interior air inlet cavity, an air inlet end of the exterior air inlet cavity is communicated with the air inlet channel, the air inlet channel is communicated with an air outlet end of the gas compressor, the combustion chamber is arranged between the interior air inlet cavity and the exterior air inlet cavity, and an air outlet of the combustion chamber is communicated with the exhaust channel;
- an impeller of the gas compressor is coaxially connected to the turbine through a rotating shaft, and a rim of the turbine stretches into the exhaust channel; and
- the rotating shaft is rotatably mounted in an air bearing, wherein a middle of the rotating shaft is provided with a thrust disc, and the air bearing comprises a thrust bearing sleeved on the thrust disc and radial bearings sleeved at two ends of the rotating shaft;
- the thrust bearing comprises a first bearing body and a second bearing body, the first bearing body and the second bearing body are symmetrically mounted with the thrust disc axially, and the first bearing body and the second bearing body have a preset first axial gap, an outer end wall of the first bearing body and an outer end wall of the second bearing body are respectively provided with a first air slot and a second air slot, a bottom of the first air slot and a bottom of the second air slot are provided with first ventilating pores, the first ventilating pores are communicated with each of the first air slot and the second air slot and the preset first axial gap, a preset third radial gap is formed between an inner ring of the first bearing body and the rotating shaft, and between an inner ring of the second bearing body and the rotating shaft, and a preset fourth radial gap is formed between a side wall of a thrust disc accommodating groove enclosed by the first bearing body and the second bearing body and a side wall of the thrust disc; and
- an outer wall of each of the radial bearings is provided with an air slot, a preset second radial gap is formed between an inner wall of each of the radial bearings and the rotating shaft, a bottom of the air slot is provided with a second ventilating pore, and the second ventilating pore is communicated with the air slot and the preset second radial gap.

19. The combined cooling heating and power micro gas turbine device according to claim 18, wherein the thrust bearing further comprises a first bearing shell and a second bearing shell, the first bearing shell comprises an end portion and a peripheral portion, the end portion of the first bearing shell is mounted at an outer end of the first bearing body and the peripheral portion of the first bearing shell covers a periphery of one radial bearing hermetically;
- the second bearing shell comprises a first cylindrical peripheral portion and a second cylindrical peripheral portion, and the first cylindrical peripheral portion and the second cylindrical peripheral portion are arranged in a stepped manner, the first cylindrical peripheral portion covers a periphery of the first bearing body and a periphery of the second bearing body, and the second cylindrical peripheral portion covers a periphery of a remaining radial bearing hermetically; and
- the first cylindrical peripheral portion of the second bearing shell is fixedly connected to an end portion of the first bearing shell axially, and the first bearing shell and/or the second bearing shell are static parts.

* * * * *